(12) United States Patent
Banzashi et al.

(10) Patent No.: US 11,702,532 B2
(45) Date of Patent: Jul. 18, 2023

(54) MICROFIBROUS CELLULOSE-CONTAINING SUBSTANCE

(71) Applicant: Oji Holdings Corporation, Tokyo (JP)

(72) Inventors: Go Banzashi, Tokyo (JP); Hiroyuki Nagatani, Tokyo (JP); Shino Iwai, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 307 days.

(21) Appl. No.: 16/952,955

(22) Filed: Nov. 19, 2020

(65) Prior Publication Data

US 2021/0079197 A1 Mar. 18, 2021

Related U.S. Application Data

(63) Continuation of application No. 15/886,643, filed on Feb. 1, 2018, now Pat. No. 10,875,988, which is a continuation of application No. 14/418,853, filed as application No. PCT/JP2013/071238 on Aug. 6, 2013, now Pat. No. 9,932,461.

(30) Foreign Application Priority Data

Aug. 10, 2012 (JP) ................................ 2012-178345
Aug. 10, 2012 (JP) ................................ 2012-178347

(51) Int. Cl.
| | | |
|---|---|---|
| *C08L 1/02* | (2006.01) | |
| *D21H 11/18* | (2006.01) | |
| *D21H 11/20* | (2006.01) | |
| *C08J 3/02* | (2006.01) | |

(52) U.S. Cl.
CPC . *C08L 1/02* (2013.01); *C08J 3/02* (2013.01); *D21H 11/18* (2013.01); *D21H 11/20* (2013.01); *C08J 2301/02* (2013.01)

(58) Field of Classification Search
None
See application file for complete search history.

(56) References Cited

U.S. PATENT DOCUMENTS

| | | | |
|---|---|---|---|
| 6,069,136 A | 5/2000 | Tahara et al. | |
| 2004/0118533 A1* | 6/2004 | Shannon | D21H 11/20 162/158 |
| 2007/0260046 A1 | 11/2007 | Tomita et al. | |
| 2011/0262731 A1 | 10/2011 | Mukai et al. | |
| 2013/0345341 A1 | 12/2013 | Harada et al. | |

FOREIGN PATENT DOCUMENTS

| | | |
|---|---|---|
| CN | 1278830 A | 1/2001 |
| CN | 1280486 A | 1/2001 |
| CN | 101874043 A | 10/2010 |
| CN | 102575430 A | 7/2012 |
| CN | 102597076 | 7/2012 |
| CN | 102597076 A | 7/2012 |
| JP | A-09-291101 | 11/1997 |
| JP | A-09-316102 | 12/1997 |
| JP | 10-265586 | 10/1998 |
| JP | A-11-209401 | 8/1999 |
| JP | A-11-255806 | 9/1999 |
| JP | A-2001-288692 | 10/2001 |
| JP | A-2004-270064 | 9/2004 |
| JP | A-2010-156069 | 7/2010 |
| JP | A-2010-168573 | 8/2010 |
| JP | A-2011-074529 | 4/2011 |
| JP | A- 2011-140738 A | 7/2011 |
| JP | A-2011-184825 | 9/2011 |
| JP | 2011-214162 | 10/2011 |
| JP | A-2012-021081 | 2/2012 |
| JP | A-2012-036529 | 2/2012 |
| JP | A-2012-051991 | 3/2012 |
| JP | 2012-126786 | 7/2012 |
| JP | B-5150792 | 2/2013 |
| WO | WO 98/56826 | 12/1998 |
| WO | WO 2010/134357 | 11/2010 |
| WO | WO 2012/124652 | 9/2012 |

OTHER PUBLICATIONS

International Search Report issued to PCT/JP2013/071238 dated Oct. 29, 2013.
Office Action in corresponding Chinese Application No. 201380053283.X, dated Nov. 27, 2015.
Office Action in Japanese Patent Application No. 2014-529506, dated Feb. 2, 2016.
Office Action issued in Chinese application No. 201380053283.X dated Jun. 14, 2016.
Office Action issued in Japanese application No. 2015-164022 dated Sep. 6, 2016.
Office Action U.S. Appl. No. 14/418,853, dated May 5, 2016.
Office Action U.S. Appl. No. 14/418,853, dated Apr. 6, 2017.
Final Office Action U.S. Appl. No. 14/418,853, dated Nov. 17, 2016.
Office Action in U.S. Appl. No. 15/886,643 dated Aug. 29, 2018.
Final Office Action in U.S. Appl. No. 15/886,643 dated Apr. 3, 2019.
Notice of Allowance in U.S. Appl. No. 15/886,643 dated Sep. 24, 2020.

* cited by examiner

*Primary Examiner* — Colin W. Slifka

(74) *Attorney, Agent, or Firm* — Knobbe. Martens, Olson & Bear, LLP

(57) ABSTRACT

A microfibrous cellulose aggregate containing microfibrous cellulose having an average fiber width of 2 nm to 50 nm and a liquid compound including at least one of water or an organic solvent. The content of the microfibrous cellulose is from 6 mass % to 80 mass % per the mass of the entire microfibrous cellulose aggregate, and the content of the liquid compound is at least 15 mass % per the mass of the entire microfibrous cellulose aggregate.

4 Claims, No Drawings

US 11,702,532 B2

MICROFIBROUS CELLULOSE-CONTAINING SUBSTANCE

This application is a continuation of U.S. patent application Ser. No. 15/886,643, filed Feb. 1, 2018, which is a continuation of U.S. patent application Ser. No. 14/418,853 (now U.S. Pat. No. 9,932,461), filed Jan. 30, 2015, which is the U. S. National Phase entry under 35 U.S.C. 371 of PCT/JP2013/071238, filed Aug. 6, 2013, which claims priority to Japanese Patent Application No. 2012-178345 filed Aug. 10, 2012, and Japanese Patent Application No. 2012-178347 filed Aug. 10, 2012, the entire contents of which are hereby incorporated herein by reference.

TECHNICAL FIELD

The present invention relates to a microfibrous cellulose aggregate, a method for manufacturing a microfibrous cellulose aggregate, and a method for remanufacturing a microfibrous cellulose dispersion liquid.

BACKGROUND ART

In recent years, materials that use recyclable natural fibers have received attention due to increasing environmental awareness and for the purpose of substituting petroleum resources. Among natural fibers, a cellulose fiber having a fiber diameter of 10 to 50 µm, particularly, a wood-derived cellulose fiber (pulp), has been widely used mainly as a paper product.

In addition, microfibrous cellulose having a nanometer-scale fiber diameter is also known as a type of cellulose fibers, and the use thereof has been investigated in recent years for various applications.

Microfibrous cellulose is manufactured, for example, by a method of fibrillating a beaten pulp (Patent Document 1) or a method of fibrillating a cellulose raw material after treating the material with co-oxidizers such as N-oxyl and sodium hypochlorite (Patent Document 2).

PRIOR ART DOCUMENTS

Patent Documents

Patent Document 1: Japanese Unexamined Patent Application Publication No. 2012-036529A
Patent Document 2: Japanese Unexamined Patent Application Publication No. 2011-184825A

SUMMARY OF THE INVENTION

Problems to be Solved by the Invention

With the manufacturing methods described in Patent Documents 1 and 2, microfibrous cellulose is obtained in the state of a dispersion liquid (slurry). Therefore, when the plant where the microfibrous cellulose dispersion liquid is manufactured and the plant where a product using microfibrous cellulose is manufactured are separated from one another, a slurry of microfibrous cellulose is filled in a container and shipped.

However, a microfibrous cellulose dispersion liquid is prepared with a low concentration in order to secure dispersion stability, so most of the product that is shipped is a liquid such as water. Therefore, the shipping cost and storage costs per unit microfibrous cellulose have tended to increase.

An object of one aspect of the present invention is to provide a microfibrous cellulose aggregate capable of reducing the shipping cost and storage cost per unit microfibrous cellulose.

An object of another aspect of the present invention is to provide a method for manufacturing a microfibrous cellulose aggregate capable of reducing the shipping cost and storage cost per unit microfibrous cellulose. An object of yet another aspect of the present invention is to provide a method for remanufacturing a microfibrous cellulose dispersion liquid in which a microfibrous cellulose dispersion liquid with a reduced shipping cost and storage cost per unit microfibrous cellulose can be obtained.

Means to Resolve the Problems

Several aspects of the present invention are described below.

[1] A microfibrous cellulose-containing substance comprising: microfibrous cellulose having an average fiber width of 2 nm to 50 nm; and a liquid compound composed of at least one of water or an organic solvent; a content of the microfibrous cellulose being from 6 mass % to 80 mass %; and a content of the liquid compound being at least 15 mass %.

[2] The microfibrous cellulose-containing substance according to [1], further comprising a flocculant containing a salt of a polyvalent metal.

[3] The microfibrous cellulose-containing substance according to [1] or [2], further comprising an acid.

[4] The microfibrous cellulose-containing substance according to [1] or [2], further comprising an alkali.

[5] The microfibrous cellulose-containing substance according to any one of [1] to [4], wherein at least 40 mass % of the solid content is microfibrous cellulose.

[6] The microfibrous cellulose-containing substance according to any one of [1] to [5], wherein a maximum fiber width of the microfibrous cellulose is at most 50 nm.

[7] A method for manufacturing a microfibrous cellulose-containing substance comprising a concentration step of concentrating a microfibrous cellulose dispersion liquid containing microfibrous cellulose having an average fiber width of 2 nm to 200 nm and a dispersion medium.

[8] The method for manufacturing a microfibrous cellulose-containing substance according to [7], wherein the concentration step comprises a flocculation step of flocculating the microfibrous cellulose contained in the microfibrous cellulose dispersion liquid, and a filtration step of removing the dispersion medium by filtering the microfibrous cellulose dispersion liquid after the flocculation step.

[9] The method for manufacturing a microfibrous cellulose-containing substance according to [8], wherein in the flocculation step, the microfibrous cellulose is flocculated by adding a flocculant containing a salt of a polyvalent metal to the microfibrous cellulose dispersion liquid.

[10] The method for manufacturing a microfibrous cellulose-containing substance according to [8] or [9], wherein if a surface charge of the microfibrous cellulose is negative, the microfibrous cellulose is flocculated by adding an acid to the microfibrous cellulose dispersion liquid in the flocculation step.

[11] The method for manufacturing a microfibrous cellulose-containing substance according to [8] or [9], wherein if a surface charge of the microfibrous cellulose is positive, the microfibrous cellulose is flocculated by adding an alkali to the microfibrous cellulose dispersion liquid in the flocculation step.

[12] The method for manufacturing a microfibrous cellulose-containing substance according to any one of [7] to [11], the microfibrous cellulose content of the microfibrous cellulose dispersion liquid being less than 6 mass %.

[13] The method for manufacturing a microfibrous cellulose-containing substance according to [12], wherein in the concentration step, the microfibrous cellulose dispersion liquid is concentrated so that a content of the microfibrous cellulose is from 6 mass % to 80 mass %.

[14] A method for remanufacturing a microfibrous cellulose dispersion liquid comprising a redispersion step of preparing a microfibrous cellulose-containing solution by adding a dispersion medium to the microfibrous cellulose-containing substance obtained by the method for manufacturing a microfibrous cellulose-containing substance according to any one of [7] to [13], and performing dispersion treatment on the microfibrous cellulose-containing solution.

[15] The method for remanufacturing a microfibrous cellulose dispersion liquid according to [14], wherein in the redispersion step, if a surface charge of the microfibrous cellulose is negative, the microfibrous cellulose-containing solution is adjusted to above pH 7 and below pH 12, and if the surface charge of the microfibrous cellulose is positive, the microfibrous cellulose-containing solution is adjusted to within a range of pH 4 to 7.

[16] One aspect of the present invention is a microfibrous cellulose aggregate comprising: microfibrous cellulose having an average fiber width of 2 nm to 50 nm; and a liquid compound composed of at least one of water or an organic solvent; a content of the microfibrous cellulose being from 6 mass % to 80 mass % per a mass of an entire microfibrous cellulose aggregate; and a content of the liquid compound being at least 15 mass % per the mass of the entire microfibrous cellulose aggregate.

[17] One aspect of the present invention may be the microfibrous cellulose aggregate according to [16], further comprising a flocculant containing a salt of a polyvalent metal.

[18] One aspect of the present invention may be the microfibrous cellulose aggregate according to [16] or [17], further comprising at least one type selected from the group consisting of acids, cationic surfactants, and cationic polymer flocculants.

[19] One aspect of the present invention may be the microfibrous cellulose aggregate according to [16] or [17], further comprising at least one type selected from the group consisting of alkalis, anionic surfactants, and anionic polymer flocculants.

[20] One aspect of the present invention may be the microfibrous cellulose aggregate according to any one of [17] to [19], further comprising a cellulose plasticizer.

[21] One aspect of the present invention may be the microfibrous cellulose aggregate according to any one of [17] to [20], wherein at least 40 mass % of a solid content contained in the microfibrous cellulose aggregate is the microfibrous cellulose.

[22] One aspect of the present invention may be the microfibrous cellulose aggregate according to any one of [16] to [21], wherein a maximum fiber width of the microfibrous cellulose is at most 50 nm.

[23] Another aspect of the present invention is a method for manufacturing a microfibrous cellulose aggregate comprising a concentration step of concentrating a first microfibrous cellulose dispersion liquid containing microfibrous cellulose having an average fiber width of 2 nm to 200 nm and a first dispersion medium.

[24] Another aspect of the present invention may be the method for manufacturing a microfibrous cellulose aggregate according to [23], wherein the concentration step comprises a flocculation step of flocculating the microfibrous cellulose contained in the first microfibrous cellulose dispersion liquid, and a filtration step of removing the first dispersion medium by filtering the first microfibrous cellulose dispersion liquid after the flocculation step.

[25] Another aspect of the present invention may be the method for manufacturing a microfibrous cellulose aggregate according to [24], wherein in the flocculation step, the microfibrous cellulose is flocculated by adding a flocculant containing a salt of a polyvalent metal to the first microfibrous cellulose dispersion liquid.

[26] Another aspect of the present invention may be the method for manufacturing a microfibrous cellulose aggregate according to [24] or [25], wherein if a surface charge of the microfibrous cellulose is negative, the microfibrous cellulose is flocculated in the flocculation step by adding at least one type selected from the group consisting of acids, cationic surfactants, and cationic polymer flocculants to the first microfibrous cellulose dispersion liquid.

[27] Another aspect of the present invention may be the method for manufacturing a microfibrous cellulose aggregate according to [24] or [25], wherein if a surface charge of the microfibrous cellulose is positive, the microfibrous cellulose is flocculated in the flocculation step by adding at least one type selected from the group consisting of alkalis, anionic surfactants, and anionic polymer flocculants to the first microfibrous cellulose dispersion liquid.

[28] Another aspect of the present invention may be the method for manufacturing a microfibrous cellulose aggregate according to any one of [24] to [27], the flocculation step including adding a cellulose plasticizer to the microfibrous cellulose aggregate.

[29] Another aspect of the present invention may be the method for manufacturing a microfibrous cellulose aggregate according to any one of [23] to [28], wherein the microfibrous cellulose content of the first microfibrous cellulose dispersion liquid is less than 6 mass % per the mass of the entire microfibrous cellulose aggregate.

[30] Another aspect of the present invention may be the method for manufacturing a microfibrous cellulose aggregate according to [29], wherein in the concentration step, the microfibrous cellulose dispersion liquid is concentrated so that the content of the microfibrous cellulose is from 6 mass % to 80 mass % per the mass of the entire microfibrous cellulose aggregate.

[31] A method for remanufacturing a microfibrous cellulose dispersion liquid comprising a redispersion step of preparing a second microfibrous cellulose-containing solution by adding a second dispersion medium to the microfibrous cellulose aggregate obtained by the method for manufacturing a microfibrous cellulose aggregate according to any one of [23] to [30], and performing dispersion treatment on the second microfibrous cellulose-containing solution.

[32] The method for remanufacturing a microfibrous cellulose dispersion liquid according to [31], wherein in the redispersion step, if a surface charge of the microfibrous cellulose is negative, the second microfibrous cellulose-containing solution is adjusted to above pH 7 and below pH 12, and if the surface charge of the microfibrous cellulose is positive, the second microfibrous cellulose-containing solution is adjusted to within a range of pH 4 to pH 7.

Effects of the Invention

With the microfibrous cellulose aggregate of one aspect of the present invention, the shipping cost and storage cost per unit microfibrous cellulose can be reduced.

If the microfibrous cellulose aggregate of one aspect of the present invention contains a flocculant or an acid, the redispersibility of the microfibrous cellulose increases when redispersed in a dispersion medium.

With the method for manufacturing a microfibrous cellulose aggregate of another aspect of the present invention, it is possible to manufacture a microfibrous cellulose aggregate capable of reducing the shipping cost and storage cost per unit microfibrous cellulose.

With the method for remanufacturing a microfibrous cellulose dispersion liquid of yet another aspect of the present invention, it is possible to obtain a microfibrous cellulose dispersion liquid capable of reducing the shipping cost and storage cost per unit microfibrous cellulose.

BEST MODE FOR CARRYING OUT THE INVENTION

"Microfibrous Cellulose Aggregate"

The microfibrous cellulose aggregate of this embodiment contains microfibrous cellulose and a liquid compound. The microfibrous cellulose aggregate of this embodiment has a high concentration of microfibrous cellulose.

A microfibrous cellulose aggregate obtained by the manufacturing method of this embodiment contains microfibrous cellulose and a liquid compound and has a high concentration of microfibrous cellulose.

The content of microfibrous cellulose in the microfibrous cellulose aggregate is preferably from 6 mass % to 80 mass %, more preferably from 10 mass % to 50 mass %, and even more preferably from 12 mass % to 30 mass % per the mass of the entire microfibrous cellulose aggregate. When the content of microfibrous cellulose is less than the lower limit described above, it is not possible to reduce the shipping cost and storage cost per unit microfibrous cellulose. On the other hand, when the content of microfibrous cellulose exceeds the upper limit described above, the redispersibility of microfibrous cellulose may decreases.

It is preferable for at least 40% of the solid content contained in the microfibrous cellulose aggregate to be microfibrous cellulose. Here, "solid components contained in the microfibrous cellulose aggregate" are cellulose and a flocculant (at least one flocculant selected from acids, alkalis, cationic surfactants, anionic surfactants, cationic polymer flocculants, and anionic polymer flocculants). The solid components contained in the microfibrous cellulose aggregate may also include a plasticizer and an emulsion resin in addition to the microfibrous cellulose and the flocculant.

Furthermore, the microfibrous cellulose aggregate may contain microfibrous cellulose, a liquid compound, and a flocculant and may also contain a plasticizer and an emulsion resin in addition to the microfibrous cellulose, the liquid compound, and the flocculant.

<Microfibrous Cellulose>

Microfibrous cellulose is a cellulose fiber or rod-like particle with a type I crystalline structure much narrower and shorter than a pulp fiber ordinarily used in papermaking applications.

In a diffraction profile obtained by wide angle x-ray diffraction image using CuKα ($\lambda$=1.5418 Å) monochromatized by graphite, it can be identified that the microfibrous cellulose has type I crystalline structure based on the presence of characteristic peaks at two positions around $2\theta$=14° to 17° and around $2\theta$=22° to 23°.

The crystallinity of the microfibrous cellulose determined by X-ray diffraction is preferably at least 60%, more preferably at least 65%, and even more preferably at least 70%. When the crystallinity is greater than or equal to the lower limit described above, even better performance can be expected in terms of heat resistance and a low coefficient of linear thermal expansion. The crystallinity can be determined by a conventional method using a pattern of X-ray diffraction profile measurements (Segal et al., Textile Research Journal, vol. 29, p. 786, 1959).

(Fiber Width)

Microfibrous cellulose is cellulose having an average fiber width of 2 nm to 200 nm determined by observation using an electron microscope. The average fiber width of the microfibrous cellulose may be from 2 nm to 150 nm. The average fiber width of the microfibrous cellulose is preferably from 2 nm to 50 nm, more preferably from 2 nm to 30 nm, particularly preferably from 2 nm to 15 nm, and most preferably from 2 nm to 10 nm. When the average fiber width of the microfibrous cellulose exceeds the upper limit described above, it becomes difficult to obtain the properties of the microfibrous cellulose (high strength, high rigidity, high dimensional stability, high dispersibility when conjugated with a resin, and transparency). When the average fiber width of the microfibrous cellulose is less than the lower limit described above, it becomes difficult to obtain the properties of the microfibrous cellulose (high strength, high rigidity, and high dimensional stability) due to the fibers being dissolved in water as cellulose molecules.

The measurement of the average fiber width by observation of microfibrous cellulose using an electron microscope is performed as described below. A sample for observation via transmission electron microscope (TEM) is obtained by preparing a slurry containing microfibrous cellulose, and casting the slurry over a hydrophilization-treated carbon film-covered grid. In the case where wide fibers are contained, an image obtained by a scanning electron microscope (SEM) of the surface of the slurry casted over glass may be observed. Depending on the width of the constituting fibers, the observation is performed with an image obtained by an electron microscope at any of magnifications of 1000×, 5000×, 10000×, 20000×, 50000×, and 100000×. However, samples, observation conditions, and magnification are adjusted to satisfy the following conditions.

(1) When a straight line X is drawn at an arbitrary position on the image for observation, 20 or more fibers cross the straight line X.

(2) When a straight line Y that intersects the straight line X perpendicularly is drawn on the same image, 20 or more fibers cross the straight line Y.

From the above described electron microscope images for observation, widths (minor axis of a fiber) of at least 20 fibers crossing the straight line X and at least 20 fibers crossing the straight line Y (that is, a total of at least 40 fibers) are read. In this manner, at least three sets of the above described electron microscope images are observed, and fiber widths of at least 3 sets of 40 fibers (that is, at least 120 fibers) are read. The average fiber width is determined by averaging the fiber widths read in this way.

The maximum fiber width of the microfibrous cellulose is preferably at most 1000 nm, more preferably at most 250 nm, even more preferably at most 50 nm, and most preferably at most 30 nm. As long as the maximum fiber width of the microfibrous cellulose is less than or equal to the upper limit described above, the strength of a composite material obtained by mixing the microfibrous cellulose and an emulsion resin will be high, and the transparency of the composite material will be easily ensured, so the microfibrous cellulose is preferable for applications requiring transparency.

(Degree of Polymerization)

The degree of polymerization of the microfibrous cellulose is preferably from 50 to 1500, more preferably from 100 to 1000, and even more preferably from 150 to 500. When the degree of polymerization of the microfibrous cellulose is greater than or equal to the lower limit described above, the microfibrous cellulose is more useful, and when the degree of polymerization is less than or equal to the upper limit described above, the redispersibility increases when the microfibrous cellulose aggregate is redispersed in a dispersion medium.

The degree of polymerization of microfibrous cellulose is measured by the method described below.

A microfibrous cellulose (supernatant liquid obtained after centrifugation; concentration: about 0.5 mass %) is spread out in a petri dish formed from polytetrafluoroethylene, and dried at 60° C. to obtain a dried sheet. The obtained dried sheet is dispersed in a dispersion medium, and the pulp viscosity is measured in accordance with Tappi T230. The blank viscosity is also measured by performing a blank test in which the viscosity is measured using the dispersion medium alone. Specific viscosity ($\eta sp$) is determined by subtracting 1 from a value obtained by dividing the pulp viscosity by the blank viscosity. Intrinsic viscosity ($[\eta]$) is calculated using the equation below.

$$[\eta]=\eta sp/(c(1+0.28\times\eta sp))$$

In the equation, c represents the cellulose content at the time of the viscosity measurement.

The degree of polymerization (DP) of this embodiment is then calculated from the following equation.

$$DP=1.75\times[\eta]$$

Since this degree of polymerization is also the average degree of polymerization measured according to viscometry, this degree of polymerization is also called "viscosity average degree of polymerization."

(Fiber Length)

In this embodiment, the major axis of the microfibrous cellulose is defined as the length. The average fiber length of the microfibrous cellulose is preferably from 0.1 μm to 5 μm. As long as the average fiber length is greater than or equal to the lower limit described above, a strength-enhancing effect can be sufficiently achieved when the microfibrous cellulose is compounded with a resin. As long as the average fiber length is less than or equal to the upper limit described above, the mixability will be better when the microfibrous cellulose is compounded with a resin. The fiber length can be determined by analyzing an electron microscope image for observation used during the average fiber width measurement described above. That is, from the above described electron microscope images for observation, fiber lengths of at least 20 fibers crossing the straight line X and at least 20 fibers crossing the straight line Y (that is, a total of at least 40 fibers) are read. In this manner, at least three sets of the above described electron microscope images are observed, and fiber lengths of at least 3 sets of 40 fibers (that is, at least 120 fibers) are read. The average fiber length is determined by averaging the fiber lengths read in this way.

When the microfibrous cellulose is applied to applications requiring strength such as a transparent substrate, the fiber length is preferably somewhat long (specifically, from 500 nm to 4 μm), and when compounded with an emulsion resin, the fiber length is preferably somewhat short (specifically, from 200 nm to 2 μm).

(Anionic Groups, Cationic Groups)

The microfibrous cellulose may have anionic groups so that the surface charge is negative. The microfibrous cellulose may also have cationic groups so that the surface charge is positive. In addition, the microfibrous cellulose may have both anionic groups and cationic groups, and in this case, the surface charge of the microfibrous cellulose may be either positive or negative. When the microfibrous cellulose has both anionic groups and cationic groups, the matter of whether the surface charge of the microfibrous cellulose is positive or negative can be assessed based on the respective contents of the anionic groups and cationic groups or the valence of the anionic and cationic groups. Even when the microfibrous cellulose has both anionic groups and cationic groups, the respective contents can be measured with a method of measuring the anionic group or cationic group content as described below.

When the microfibrous cellulose has anionic groups or cationic groups, the content thereof is preferably from 0.06 mmol/g to 2.0 mmol/g, more preferably from 0.1 mmol/g to 1.0 mmol/g, and even more preferably from 0.2 mmol/g to 0.6 mmol/g. When the content of cationic groups or anionic groups is within the range described above, the wettability of the microfibrous cellulose does not become too high, and the viscosity when formed into a slurry becomes low. When the content of anionic groups or cationic groups exceeds the upper limit described above, there is a risk that the wettability may become too high and that the microfibrous cellulose will dissolve.

Examples of anionic groups include carboxylic acid groups, phosphoric acid groups, sulfonic acid groups, and the like. Cellulose contains a little amount of (specifically, 0.1 mmol/g or less) carboxy group without applying a carboxy group introduction treatment.

The content of anionic groups is determined using the method described in "Test Method T237 cm-08 (2008): Carboxyl Content of pulp" of the United States TAPPI. The method is in accordance with TAPPI T237 cm-08 (2008) with the exception that, among the test solutions used in the above test method, the test solution containing 0.84 g/5.85 g of sodium bicarbonate ($NaHCO_3$)/sodium chloride (NaCl) dissolved and diluted with 1000 mL of distilled water was changed to 1.60 g of sodium hydroxide so that the concentration of the test solution substantially increases four-fold in order to be able to measure the content of anionic groups over a wider range. In addition, when anionic groups are introduced, the difference between the measured values of the cellulose fibers before and after the introduction of anionic groups is used as the essential anionic group content. An absolute dry cellulose fiber of the measurement sample is an absolute dry cellulose fiber obtained by freeze-drying to avoid deterioration in cellulose which may occur due to heat during heat-drying.

Since the measurement method for anionic group content is a measurement method for monovalent anionic groups (carboxy groups), when the anionic groups to be quantified are polyvalent, a value determined by dividing the value obtained as the monovalent anionic group content by the acid value is used as the anionic group content.

A cationic group is a group having an onium such as ammonium, phosphonium, or sulfonium in the group, and the group typically has a molecular weight of at most approximately 1000. Specific examples include ammoniums such as primary ammonium, secondary ammonium, tertiary ammonium, or quaternary ammonium, phosphonium, sulfonium, and groups having these ammoniums, phosphonium, or sulfonium.

Groups having these ammonium, phosphonium, or sulfonium preferably have groups that react with the hydroxyl groups of cellulose in portions other than the ammonium, phosphonium, or sulfonium. The groups that react with the hydroxyl groups of cellulose are not particularly limited as long as they are reactive groups which react with the hydroxyl groups to form covalent bonds, and examples include epoxy groups or halohydrin groups capable of forming epoxy groups, active halogen groups, active vinyl groups, methylol groups, and the like. Of these, epoxy groups or halohydrin groups capable of forming epoxy groups are preferable from the perspective of reactivity.

Groups having ammonium, phosphonium, or sulfonium can be introduced into cellulose by reacting a compound having these oniums with cellulose. Examples of compounds having oniums include glycidyl trialkyl ammonium halides such as glycidyl trimethyl ammonium chloride and 3-chloro-2-hydroxypropyl trimethyl ammonium chloride, or halohydrin forms thereof.

The content of cationic groups is measured with the following method.

First, 0.5 g, in terms of absolute dry mass, of a pulp slurry that has been subjected to cationization agent treatment is taken and diluted to a concentration of 1 mass % (wet weight: 50 g) with ion-exchanged water. Next, 0.67 g of a 30 mass % sodium hydroxide solution is added to this in small increments while sufficiently stirring, and this is left to stand for 2 hours. The pulp is filtered, and the pulp on the filter paper is washed with ion-exchanged water. The endpoint of washing is defined as the point when the pH of the filtrate reaches 8.5 or lower.

The entire amount of pulp on the filter paper is transferred to a 100 mL screw vial, and in order to measure the water content in the sample, the mass of the pulp at this time is precisely measured and recorded. Next, 100 g of a 0.05 N hydrochloric acid solution is added to the precisely measured pulp, and a lid is placed on the screw vial. After the solution is vigorously shaken and mixed, the solution is left to stand for 1 hour.

Using a glass filter that has been sufficiently dried, the slurry in the screw vial is filtered, and the filtrate is collected on a receptacle. After 3 g of the obtained filtrate is transferred to a 100 mL beaker, 2 or 3 drops of a methyl red indicator are added, and titration is performed with a 0.01 N sodium hydroxide solution. The sodium hydroxide solution is dropped into the solution, and the endpoint of titration is determined as the point when the color of the solution changes from the original pink color to orange and yellow.

The amount of cationic groups that are introduced is calculated in accordance with the calculation formulation shown in Formula 1. The blank value of titration is determined by the titration of 3 g of a 0.05 N hydrochloric acid solution.

$$\text{(Substituent amount)[mmol/g]} = \left\{\left(V_0 \times C_{NaOH} \times \frac{W_{HCl}}{W_0}\right) - \left(V \times C_{NaOH} \times \frac{W_{HCl} + W_{water}}{W_{sample}}\right)\right\}/W_{BD-pulp}/N =$$

$$\left\{\left(V_0 \times \frac{W_{HCl}}{W_0}\right) - \left(V \times \frac{W_{HCl} + W_{water}}{W_{sample}}\right)\right\} \frac{C_{NaOH}}{W_{BD-pulp}N}$$ [Formula 1]

$V_0$: blank titration amount, $C_{NaOH}$: sodium hydroxide solution concentration, $W_{HCl}$: amount of hydrochloric acid added to the sample, $W_0$: amount of blank hydrochloric acid collected, V: titration amount of the sample, $W_{sample}$: amount of the sample filtrate collected, $W_{water}$: water content in the sample, $W_{BS-pulp}$: absolute dry mass of the sample, N: valence of the substituents <Liquid Compound>

The liquid compound contained in the microfibrous cellulose aggregate is a dispersion medium (first dispersion medium) used when manufacturing the microfibrous cellulose. In addition, the liquid compound is a dispersion medium (second dispersion medium) used when remanufacturing the microfibrous cellulose. The liquid compound contained in the microfibrous cellulose aggregate is composed of at least one of water or an organic solvent.

Water alone is preferably used as the liquid compound from the perspective of handleability or cost, but an organic solvent may be used in combination with water, or an organic solvent may be used alone. Preferable organic solvents are polar solvents such as alcohol solvents (methanol, ethanol, propanol, butanol, or the like), ketone solvents (acetone, methyl ethyl ketone, or the like), ether solvents (diethyl ether, ethylene glycol dimethyl ether, tetrahydrofuran, or the like), and acetate solvents (ethyl acetate or the like).

The content of the liquid compound in the microfibrous cellulose aggregate is above 15 mass %, preferably above 50 mass %, and more preferably above 70 mass % with per the mass of the entire microfibrous cellulose aggregate. When the content of the liquid compound is less than the lower limit described above, the redispersibility of the microfibrous cellulose may decrease.

The content of the liquid compound is preferably at most 94 mass % with respect to the mass of the entire microfibrous cellulose aggregate.

<Flocculant Containing a Salt of a Polyvalent Metal>

The microfibrous cellulose aggregate may contain a flocculant containing a salt of a polyvalent metal, which is used in the manufacturing method of the microfibrous cellulose aggregate described below.

Specific examples of flocculants include aluminum sulfate (sulfuric acid band), aluminum polychloride, calcium chloride, magnesium chloride, potassium chloride, calcium sulfate, magnesium sulfate, potassium sulfate, lithium phosphate, potassium phosphate, trisodium phosphate, disodium hydrogen phosphate, and the like. One type of these flocculants may be contained in the microfibrous cellulose aggregate, or two or more types of these flocculants may be contained.

Of the flocculants containing salts of polyvalent metals, aluminum sulfate is preferable when the surface charge of the microfibrous cellulose is negative, and disodium hydrogen phosphate is preferable when the surface charge of the microfibrous cellulose is positive from the perspective of aggregability and cost.

When a flocculant containing a salt of a polyvalent metal is contained in the microfibrous cellulose aggregate, the content is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose. The microfibrous cellulose aggregate having a flocculant content of greater than or equal to the lower limit described above can be obtained in a short period of time. However, it is futile for a flocculant to be added in excess of the upper limit described above since there will be practically no improvement in the aggregability.

<Acid>

When the surface charge of the microfibrous cellulose is negative (when the microfibrous cellulose is anionic), the microfibrous cellulose aggregate may contain an acid used in the manufacturing method of the microfibrous cellulose aggregate described below. The acid may be either an inorganic acid or an organic acid.

Examples of inorganic acids include sulfuric acid, hydrochloric acid, nitric acid, phosphoric acid, and the like.

Examples of organic acids include formic acid, acetic acid, citric acid, malic acid, lactic acid, adipic acid, sebacic acid, stearic acid, maleic acid, succinic acid, tartaric acid, fumaric acid, gluconic acid, and the like. One type of these acids may be contained in the microfibrous cellulose aggregate, or two or more types of these acids may be contained.

Of these acids, sulfuric acid is preferable from the perspectives of aggregability and cost.

When an acid is contained in the microfibrous cellulose aggregate, the pH thereof is preferably below 4.0, more preferably below 3.5, and even more preferably below 3.2. Here, the pH is the value at 23° C.

A microfibrous cellulose aggregate with a pH lower than or equal to the upper limit described above can be obtained in a short period of time. In addition, as long as the pH of the microfibrous cellulose aggregate is less than or equal to the upper limit described above, it is possible to improve the redispersibility of the microfibrous cellulose when the microfibrous cellulose aggregate is redispersed in a dispersion medium.

The pH of the microfibrous cellulose aggregate is preferably at least 1.0, more preferably above 1.5, and even more preferably above 2.0. From a practical standpoint, it is difficult to set the pH of the microfibrous cellulose aggregate to a level lower than the lower limit described above.

<Cationic Surfactant>

When the surface charge of the microfibrous cellulose is negative (when the microfibrous cellulose is anionic), the microfibrous cellulose aggregate may contain a cationic surfactant.

Examples of types of cationic surfactants include quaternary ammonium salts such as alkyl trimethyl ammonium salts, dialkyl dimethyl ammonium salts, alkyl dimethyl benzyl ammonium salts, acyl amino ethyl diethyl ammonium salts, acyl amino ethyl diethyl amine salts, alkyl amide propyl dimethyl benzyl ammonium salts, alkyl pyridinium salts, alkyl pyridinium sulfuric acid salts, stearamide methyl pyridinium salts, alkyl quinolinium salts, alkyl isoquinolinium salts, fatty acid polyethylene polyamides, acyl amino ethyl pyridinium salts, and acyl colamino formyl methyl pyridinium salts, ester-bonded amine or ether-bonded quaternary ammonium salts such as stearoxy methyl pyridinium salts, fatty acid triethanolamine, fatty acid triethanolamine formic acid salts, trioxyethylene fatty acid triethanolamine, cetyloxy methyl pyridinium salts, and p-isooctyl phenoxy ethoxy ethyl dimethyl benzyl ammonium salts, heterocyclic amines such as alkyl imidazoline, 1-hydroxyethyl-2-alkylimidazoline, 1-acetylaminoethyl-2-alkylimidazoline, and 2-alkyl-4-methyl-4-hydroxymethyloxazoline, and amine derivatives such as polyoxyethylene alkyl amine, N-alkyl propylene diamine, N-alkyl polyethylene polyamine, N-alkyl polyethylene polyamine dimethyl sulfuric acid salts, alkyl biguanide, and long-chain amine oxide, and the like. One type of these cationic surfactants may be contained in the microfibrous cellulose aggregate, or two or more types of these cationic surfactants may be contained.

When a cationic surfactant is contained in the microfibrous cellulose aggregate, the content is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose. The microfibrous cellulose aggregate with a surfactant content greater than or equal to the lower limit described above can be obtained in a short period of time. However, it is futile for a surfactant to be added in excess of the upper limit described above since there will be practically no improvement in the aggregability.

<Cationic Polymer Flocculant>

When the surface charge of the microfibrous cellulose is negative (when the microfibrous cellulose is anionic), the microfibrous cellulose aggregate may contain a cationic polymer flocculant.

Examples of types of cationic polymer flocculants include copolymers with cationic monomers such as acrylamide and dialkyl amino alkyl (meth)acrylate, dialkyl amino alkyl (meth)acrylamide, or salts or quaternary compounds thereof, or homopolymers or copolymers of these cationic monomers. One type of these cationic polymer flocculants may be contained in the microfibrous cellulose aggregate, or two or more types of these cationic polymer flocculants may be contained.

When a cationic polymer flocculant is contained in the microfibrous cellulose aggregate, the content is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose. The microfibrous cellulose aggregate with a polymer flocculant content greater than or equal to the lower limit described above can be obtained in a short period of time. However, it is futile for a polymer flocculant to be added in excess of the upper limit described above since there will be practically no improvement in the aggregability.

When the surface charge of the microfibrous cellulose is negative (when the microfibrous cellulose is anionic), the microfibrous cellulose aggregate may contain at least one of the aforementioned acids, cationic surfactants, and cationic polymer flocculants. In addition, in this case, the microfibrous cellulose aggregate may further contain a flocculant containing a salt of a polyvalent metal.

<Alkali>

When the surface charge of the microfibrous cellulose is positive (when the microfibrous cellulose is cationic), the microfibrous cellulose aggregate may contain an alkali. The alkali may be an inorganic alkali compound or an organic alkali compound.

Examples of inorganic alkali compounds include lithium hydroxide, sodium hydroxide, potassium hydroxide, calcium hydroxide, lithium carbonate, lithium hydrogen carbonate, potassium carbonate, potassium hydrogen carbonate, sodium carbonate, sodium hydrogen carbonate, calcium carbonate, calcium phosphate, calcium hydrogen phosphate, and the like.

Examples of organic alkali compounds include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethyl ammonium hydroxide, tetraethyl ammonium hydroxide, tetrapropyl ammonium hydroxide, tetrabutyl ammonium hydroxide, benzyl trimethyl ammonium hydroxide, pyridine, N,N-dimethyl-4-aminopyridine, and the like.

One type of the alkali compounds described above may be used alone, or two or more types of the alkali compounds described above may be used in combination. Of these alkalis, sodium hydroxide is preferable from the perspectives of aggregability and cost.

When an alkali is contained in the microfibrous cellulose aggregate, the pH thereof is preferably above 10.0 and more preferably above 12.0. Here, the pH is the value at 23° C. A microfibrous cellulose aggregate with a pH greater than or equal to the upper limit described above can be obtained in a short period of time.

The pH of the microfibrous cellulose aggregate is preferably below 14.0 and more preferably below 13.0. From a practical standpoint, it is difficult to set the pH of the microfibrous cellulose aggregate to a level exceeding the upper limit described above.

<Anionic Surfactant>

When the surface charge of the microfibrous cellulose is positive (when the microfibrous cellulose is cationic), the microfibrous cellulose aggregate may contain an anionic surfactant.

Examples of types of anionic surfactants include sodium oleate, potassium oleate, sodium laurate, sodium dodecylbenzene sulfonate, sodium alkylnaphthalene sulfonate, sodium dialkyl sulfosuccinate, sodium polyoxyethylene alkyl ether sulfate, sodium polyoxyethlyene alkyl allyl ether sulfate, sodium polyoxyethylene dialkyl sulfate, polyoxyethylene alkyl ether phosphoric acid ester, polyoxyethylene alkyl allyl ether phosphoric acid ester, and the like. One type of these anionic surfactants may be contained in the microfibrous cellulose aggregate, or two or more types of these anionic surfactants may be contained.

When an anionic surfactant is contained in the microfibrous cellulose aggregate, the content is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose. The microfibrous cellulose aggregate with a surfactant content greater than or equal to the lower limit described above can be obtained in a short period of time. However, it is futile for a surfactant to be added in excess of the upper limit described above since there will be practically no improvement in the aggregability.

<Anionic Polymer Flocculant>

When the surface charge of the microfibrous cellulose is positive (when the microfibrous cellulose is cationic), the microfibrous cellulose aggregate may contain an anionic polymer flocculant used in the manufacturing method of the microfibrous cellulose-containing substance described below. Examples of types of anionic polymer flocculants include polyacrylic acids, sodium polyacrylate, copolymers of (meth)acrylic acids or alkali metal salts thereof and (meth)acrylamide, poly(meth)acrylamide hydrolysates, acryloylamino-2-methylpropyl sulfonic acid, styrene sulfonic acid, copolymers of vinyl sulfonic acids such as vinyl sulfonic acids or salts thereof and (meth)acrylic acids or alkali metal salts thereof and (meth)acrylamide, carboxymethylcellulose, carboxymethyl starch, sodium alginate, and the like. One type of these anionic polymer flocculants may be contained in the microfibrous cellulose aggregate, or two or more types of these anionic polymer flocculants may be contained.

When an anionic polymer flocculant is contained in the microfibrous cellulose aggregate, the content is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose.

The microfibrous cellulose aggregate with a polymer flocculant content greater than or equal to the lower limit described above can be obtained in a short period of time. However, it is futile for a polymer flocculant to be added in excess of the upper limit described above since there will be practically no improvement in the aggregability.

When the surface charge of the microfibrous cellulose is positive (when the microfibrous cellulose is cationic), the microfibrous cellulose aggregate may contain at least one of the aforementioned alkalis, anionic surfactants, and anionic polymer flocculants. In addition, in this case, the microfibrous cellulose aggregate may further contain a flocculant containing a salt of a polyvalent metal.

<Plasticizer>

Regardless of whether the surface charge of the microfibrous cellulose is positive or negative, the microfibrous cellulose aggregate may contain a cellulose plasticizer. When a plasticizer is contained in the microfibrous cellulose aggregate, hydrogen bonds between the fibers of the microfibrous cellulose can be inhibited in the concentration step. This facilitates dispersion in the redispersion step even after the solid content concentration is increased at the time of concentration.

Examples of types of plasticizers include polyvalent alcohols such as sugar, sugar alcohol, glycerin, ethylene glycol, propanediol, butanediol, butanetriol, cyclobutanediol, butanetetraol, cyclobutanetetraol, pentanediol, cyclopentanediol, pentanetriol, pentanetetraol, cyclopentanetriol, or hydroquinone, aliphatic amines such as ethylenediamine, trimethylenediamine, triethylenediamine, tetramethylenediamine, hexamethylenediamine, diethylenetriamine, triethylenetetramine, and tetraethylenepentamine, and urea compounds such as urea. Two or more types of these plasticizers may also be contained.

When a plasticizer is contained in the microfibrous cellulose aggregate, the content is preferably from 0.5 parts by mass to 10,000 parts by mass, more preferably from 1.0 parts by mass to 8,000 parts by mass, and even more preferably from 2 parts by mass to 5,000 parts by mass with respect to 100 parts by mass of the microfibrous cellulose. The microfibrous cellulose aggregate having a plasticizer content greater than or equal to the lower limit described above has good redispersibility after concentration. However, it is futile for a plasticizer to be added in excess of the upper limit described above since there will be practically no improvement in the dispersibility at the time of redispersion.

<Emulsion Resin>

The microfibrous cellulose aggregate may contain an emulsion resin. When an emulsion resin is contained in the microfibrous cellulose aggregate, it becomes difficult for aggregates to be formed when an emulsion resin is mixed into a microfibrous cellulose dispersion liquid obtained from the microfibrous cellulose aggregate. Therefore, a compound material comprising the microfibrous cellulose and an emulsion resin can be manufactured easily.

Here, an emulsion resin refers to particles of a natural resin or synthetic resin emulsified in a dispersion medium, the particle size being from 0.001 µm to 10 µm. The type of resin constituting the emulsion resin is not particularly limited, but examples include precursors such as polystyrenes, polyvinyl chloride, polyvinylidene chloride, vinyl polyacetate, ethylene-vinyl acetate copolymers, poly(meth)acrylic acid alkyl ester polymers, (meth)acrylic acid alkyl ester copolymers, poly(meth)acrylonitrile, polyesters, polyurethanes, polyamides, epoxy resins, oxetane resins, phenol resins, urea resins, melamine resins, unsaturated polyester resins, silicon resins, and diallyl phthalate resins, and resin emulsions such as monomers or oligomers constituting these precursors, natural rubbers, styrene-butadiene copolymers, (meth)acrylonitrile-butadiene copolymers, polyisoprenes, polychloroprenes, styrene-butadiene-methyl methacrylate copolymers, styrene-(meth)acrylic acid alkyl ester copolymers, and the like. In addition, the emulsion resin may also be a polyethylene, a polypropylene, a polyurethane, an ethylene-vinyl acetate copolymer, or the like emulsified by a subsequent emulsion method. Two or more types of these emulsion resins may also be contained.

<Other Components>

The microfibrous cellulose aggregate may contain preservatives, pigments, UV absorbers, antioxidants, or the like as necessary.

"Method for Manufacturing a Microfibrous Cellulose Aggregate"

The microfibrous cellulose aggregate described above is manufactured by a manufacturing method having a concentration step of concentrating a microfibrous cellulose dispersion liquid in a slurry form containing microfibrous cellulose and a liquid compound as a dispersion medium.

<Microfibrous Cellulose Dispersion Liquid Preparation Method>

The microfibrous cellulose dispersion liquid (first microfibrous cellulose dispersion liquid) used in the concentration step is prepared from a microfibrous cellulose raw material (hereafter called a "cellulose raw material") with a preparation method having a chemical treatment step and a fibrillation step.

(Cellulose Raw Material)

The cellulose raw material is a material containing cellulose, examples of which include pulp for papermaking, cotton pulp such as cotton linters or cotton lint, non-wood pulp such as hemp, straw, or bagasse, and cellulose isolated from sea squirts, seaweed or the like. Of these, from the perspectives of availability, pulp for papermaking is preferable. Examples of pulp for papermaking include hardwood kraft pulp (bleached kraft pulp (LBKP), unbleached kraft pulp (LUKP), oxygen bleached kraft pulp (LOKP), and the like); softwood kraft pulp (bleached kraft pulp (NBKP), unbleached kraft pulp (NUKP), oxygen bleached kraft pulp (NOKP), and the like); chemical pulp such as sulfite pulp (SP) and soda pulp (AP); semichemical pulp such as semichemical pulp (SCP) and chemiground wood pulp (CGP); mechanical pulp such as groundwood pulp (GP) and thermomechanical pulp (TMP or BCTMP); non-wood pulp in which the raw material is paper mulberry, mitsumata, hemp, kenaf, or the like; and deinked pulp in which the raw material is a used paper. Of these, from the perspectives of availability, kraft pulp, deinked pulp, or sulfite pulp is preferable.

One type of the cellulose raw material may be used alone, or two or more types of the cellulose raw material may be used in combination.

(Chemical Treatment Step)

The chemical treatment step is a step of performing chemical treatment on the cellulose raw material. Chemical treatment includes at least one type from among steps (a) to (g) below.

Step (a) is a treatment step using a carboxylic acid compound. Step (b) is a treatment step using an oxoacid containing phosphorus atoms or a salt thereof. Step (c) is a treatment step using ozone. Step (d) is a treatment step using an enzyme. Step (e) is a treatment step using a 2,2,6,6-tetramethylpiperidinooxy radical (hereafter abbreviated as "TEMPO"). Step (f) is a treatment step using sulfuric acid. Step (g) is a cationization agent treatment step.

[Treatment Using a Carboxylic Acid Compound]

In treatment using a carboxylic acid compound, the hydroxy groups of the cellulose molecule and a carboxylic acid compound undergo a dehydration reaction so as to form a polar group (—COO—). As a result, the bonding strength between cellulose fibers weakens, and the fibrillation properties improve.

Examples of methods for treating the cellulose raw material using a carboxylic acid compound include a method of mixing a gasified carboxylic acid compound into the cellulose raw material and a method of adding a carboxylic acid compound to a dispersion liquid of the cellulose raw material. Of these, the method of mixing a gasified carboxylic acid compound into the cellulose raw material is preferable in that the process is simple and the efficiency of introducing carboxy groups increases. An example of a method for gasifying the carboxylic acid compound is a method of heating the carboxylic acid compound.

The carboxylic acid compound used in this treatment is at least one type selected from the group consisting of compounds having two carboxy groups, acid anhydrides of compounds having two carboxy groups, and derivatives thereof. Of the compounds having two carboxy groups, compounds having two carboxy groups (dicarboxylic acid compounds) are preferable.

Examples of compounds having two carboxy groups include dicarboxylic acid compounds such as propanedioic acid (malonic acid), butanedioic acid (succinic acid), pentanedioic acid (glutaric acid), hexanedioic acid (adipic acid), 2-methylpropanedioic acid, 2-methylbutanedioic acid, 2-methylpentanedioic acid, 1,2-cyclohexanedicarboxylic acid, 2-butenedioic acid (maleic acid, fumaric acid), 2-pentenedioic acid, 2,4-hexadienedioic acid, 2-methyl-2-butenedioic acid, 2-methyl-2-pentenedioic acid, 2-methylidenebutanedioic acid (itaconic acid), benzene-1,2-dicarboxylic acid (phthalic acid), benzene-1,3-dicarboxylic acid (isophthalic acid), benzene-1,4-dicarboxylic acid (terephthalic acid), and ethanedioic acid (oxalic acid).

Examples of acid anhydrides of compounds having two carboxy groups include maleic anhydride, succinic anhydride, phthalic anhydride, glutaric anhydride, adipic anhydride, itaconic anhydride, pyromellitic anhydride, dicarboxylic acid compounds such as 1,2-cyclohexane dicarboxylic acid anhydride, and acid anhydrides of compounds containing a plurality of carboxy groups.

Examples of derivatives of acid anhydrides of compounds having two carboxy groups include substances in which at least some of the hydrogen atoms of an acid anhydride of a compound having carboxy groups, such as dimethyl maleic anhydride, diethyl maleic anhydride, and diphenyl maleic anhydride, are substituted with substituents (for example, alkyl groups, phenyl groups, or the like).

Of these, maleic anhydride, succinic anhydride, and phthalic anhydride are preferable in that they can be easily applied industrially and can be easily gasified.

The mass ratio of the carboxylic acid compound to the cellulose raw material is preferably such that the amount of the carboxylic acid compound is from 0.1 parts by mass to 500 parts by mass and more preferably from 10 parts by mass to 200 parts by mass with respect to 100 parts by mass of the cellulose raw material. When the ratio of the carboxylic acid compound is greater than or equal to the lower limit described above, the yield of the microfibrous cellulose can be further improved. However, when the ratio exceeds the upper limit described above, the yield-improving effect hits a ceiling, and the carboxylic acid compound is simply used wastefully.

The apparatus used in this treatment is not particularly limited, but, for example, a heating reaction vessel or a rotary type heating reaction vessel having stirring blades, a pressure vessel or a rotary type pressure vessel having a heating jacket, single-shaft mixers and double-shaft mixers having heating jackets, a twin-screw extruder, a multi-screw kneading extruder, or kneading apparatus having a heating apparatus such as a pressure kneader or a dual arm type kneader may be used.

The treatment temperature is preferably at most 250° C. from the perspective of the thermolysis temperature of cellulose.

Furthermore, when water is contained at the time of treatment, the temperature is preferably from 80° C. to 200° C. and more preferably from 100° C. to 170° C.

The treatment time is preferably from 10 minutes to 5 hours.

In this treatment, a catalyst may also be used as necessary. A basic catalyst such as pyridine, triethylamine, sodium hydroxide, or sodium acetate or an acidic catalyst such as acetic acid, sulfuric acid, or perchloric acid is preferably used as the catalyst.

After treatment using a carboxylic acid compound, it is preferable to perform alkali treatment for treating the cellulose dispersion liquid obtained as a result of the above treatment with an alkali solution.

The method used for alkali treatment is not particularly limited, but an example is a method of immersing the treated cellulose in an alkali solution.

The alkali compound contained in the alkali solution may be an inorganic alkali compound or an organic alkali compound. Examples of inorganic alkali compounds include hydroxides of alkali metals or hydroxides of alkali earth metals, carbonates of alkali metals or carbonates of alkali earth metals, and phosphates of alkali metals or phosphates of alkali earth metals. Examples of hydroxides of alkali metals include lithium hydroxide, sodium hydroxide, and potassium hydroxide, and an example of a hydroxide of an alkali earth metal is calcium hydroxide.

Examples of carbonates of alkali metals include lithium carbonate, lithium hydrogen carbonate, potassium carbonate, potassium hydrogen carbonate, sodium carbonate, and sodium hydrogen carbonate. An example of a carbonate of an alkali earth metal is calcium carbonate.

Examples of phosphates of alkali metals include lithium phosphate, potassium phosphate, trisodium phosphate, disodium hydrogen phosphate, and the like. Examples of phosphates of alkali earth metals include calcium phosphate, calcium hydrogen phosphate, and the like.

Examples of organic alkali compounds include ammonia, aliphatic amines, aromatic amines, aliphatic ammonium, aromatic ammonium, heterocyclic compounds and hydroxides thereof, carbonates thereof, and phosphates thereof.

Examples include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethyl ammonium hydroxide, tetraethyl ammonium hydroxide, tetrapropyl ammonium hydroxide, tetrabutyl ammonium hydroxide, benzyl trimethyl ammonium hydroxide, pyridine, N,N-dimethyl-4-aminopyridine, ammonium carbonate, ammonium hydrogen carbonate, 2-ammonium hydrogen phosphate, and the like.

One type of the alkali compounds described above may be used alone, or two or more types of the alkali compounds may be used in combination.

The solvent in the alkali solution may be either water or an organic solvent, but a polar solvent (water or a polar organic solvent such as alcohol) is preferable, and a water-based solvent containing at least water is more preferable.

In addition, of these alkali solutions, a sodium hydroxide aqueous solution, a potassium hydroxide aqueous solution, and an ammonia aqueous solution are particularly preferable due to their high versatility.

The pH at 25° C. of the alkali solution in which cellulose is immersed is preferably at least 9, more preferably at least 10, and even more preferably from 11 to 14. When the pH of the alkali solution is greater than or equal to the lower limit described above, the yield of the microfibrous cellulose becomes even higher. However, when the pH exceeds 14, the handleability of the alkali solution decreases.

[Treatment Using an Oxoacid Containing Phosphorus Atoms or a Salt Thereof]

In treatment using an oxoacid containing phosphorus atoms (hereafter called a "phosphorus oxoacid") or a salt thereof, the hydroxy groups of the cellulose molecule and a phosphorus oxoacid having at least $(HPO_4)^{2-}$ or a salt thereof undergo a dehydration reaction so as to form a polar group ($-O-PO_3^{2-}$) as described in the following reaction formula (A). As a result, the bonding strength between cellulose fibers weakens, and the fibrillation properties improve.

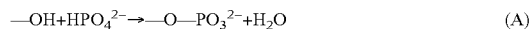

$$-OH + HPO_4^{2-} \rightarrow -O-PO_3^{2-} + H_2O \qquad (A)$$

Examples of phosphorus oxoacids include phosphoric acid, metaphosphoric acid, polyphosphoric acid, and the like.

Examples of phosphorus oxoacid salts include lithium salts, sodium salts, potassium salts, calcium salts, ammonium salts, and organic alkali salts of phosphoric acid, metaphosphoric acid, and polyphosphoric acid, and the like.

One type of phosphorus oxoacid or a salt thereof may be used alone, or two or more types of phosphorus oxoacid or a salt thereof may be used in combination.

Of these, phosphoric acid and/or sodium salts of phosphoric acid and potassium salts of phosphoric acid are preferable due to their low cost, ease of handling, and high phosphoric acid group introduction efficiency.

The mass ratio of the phosphorus oxoacid or a salt thereof to the cellulose raw material is preferably such that the amount of the phosphorus oxoacid or a salt thereof is, in terms of the phosphorus element amount, from 0.2 parts by mass to 500 parts by mass, more preferably from 1 parts by mass to 400 parts by mass, and most preferably from 2 parts by mass to 200 parts by mass with respect to 100 parts by mass of the cellulose raw material. When the ratio of the phosphorus oxoacid or a salt thereof is greater than or equal to the lower limit described above, the yield of the microfibrous cellulose can be further improved. However, when the ratio exceeds the upper limit described above, the yield-improving effect hits a ceiling, and the phosphorus oxoacid or a salt thereof is simply used wastefully.

The thermal treatment temperature is preferably at most 250° C. from the perspective of the thermolysis temperature of cellulose. In addition, the thermal treatment temperature is preferably from 100° to 170° C. from the perspective of suppressing the hydrolysis of the cellulose. Furthermore, the heating while water is contained in the system in which the phosphorus oxoacid or a salt thereof is added at the time of thermal treatment is preferably performed at a temperature of at most 130° C. and more preferably at most 110° C. so as to sufficiently remove and dry the water content. It is preferable to perform thermal treatment thereafter at 100° C. to 170° C. In addition, when removing the water content, a vacuum dryer may be used.

The treatment time is preferably from 10 minutes to 5 hours.

After treatment using a phosphorus oxoacid or a salt thereof, alkali treatment may be performed in the same manner as in the case of treatment using a carboxylic acid compound.

[Treatment Using Ozone]

In treatment using ozone, some of the hydroxyl groups of cellulose are substituted with carbonyl groups or carboxy groups. As a result, the bonding strength between cellulose fibers weakens, and the fibrillation properties improve.

Ozone can be generated by supplying an oxygen-containing gas such as air, oxygen gas, or oxygen-enriched air to a known ozone-generating apparatus.

Treatment using ozone is performed by exposing the cellulose raw material to a closed space/atmosphere in which ozone is present.

When the ozone concentration in the gas containing ozone is 250 $g/m^3$ or higher, there is a risk of explosion, so the concentration must be less than 250 $g/m^3$. However, when the concentration is low, the amount of ozone used increases, so the concentration is preferably from 50 $g/m^3$ to 215 $g/m^3$. When the ozone concentration is greater than or equal to the lower limit described above, the ozone is easy to handle, and the yield improving effect of the microfibrous cellulose becomes even higher in the fibrillation step.

The amount of ozone added to the cellulose raw material is not particularly limited, but the amount is preferably from 5 parts by mass to 30 parts by mass with respect to 100 parts by mass of the solid content of the cellulose raw material. When the amount of ozone added is greater than or equal to the lower limit described above, the yield improving effect of the microfibrous cellulose becomes even higher in the fibrillation step. However, when the amount exceeds the upper limit described above, this causes a decrease in yield and the deterioration of dewaterability before and after ozone treatment. In addition, the yield improving effect of the microfibrous cellulose hits a ceiling in the fibrillation step.

The ozone treatment temperature is not particularly limited and is adjusted appropriately in a range of 0° C. to 50° C. In addition, the ozone treatment time is not particularly limited and is adjusted appropriately in a range of 1 minute to 360 minutes.

After ozone treatment is performed on the cellulose raw material, additional oxidation treatment may be performed. Examples of oxidizing agents used in additional oxidation treatment include chlorine-based compounds such as chlorine dioxide and sodium chlorite.

After ozone treatment, alkali treatment may be performed in the same manner as in the case of treatment using a carboxylic acid compound.

[Treatment Using an Enzyme]

In treatment using an enzyme, the cellulose can be decomposed by an enzyme.

The cellulolytic enzyme used in the enzyme treatment is an enzyme generally termed cellulase having cellobiohydrolase activity, endo-glucanase activity, or beta-glycosidase activity.

The cellulolytic enzyme used in the enzyme treatment may be a commercially available cellulase formulations although the cellulolytic enzyme may be prepared by mixing various cellulolytic enzymes with enzymes each having activity at appropriate amounts. Many of commercially available cellulase formulations simultaneously have various cellulase activities described above and a hemicellulase activity.

Commercially available cellulase formulations include cellulase formulations derived from the genus *Trichoderma*, the genus *Acremonium*, the genus *Aspergillus*, the genus *Phanerochaete*, the genus *Trametes*, the genus *Humicola*, the genus *Bacillus*, and the like. Examples of such commercially available cellulase formulations include Cell Leucine T2 (manufactured by HBI Enzymes Inc.), Meicelase (manufactured by Meiji Seika Kaisha, Limited), Novozyme 188 (manufactured by Novozymes), Multifect CX10L (manufactured by Genencor), and the like (all mentioned in trade names).

In the enzyme treatment, in addition to cellulase, hemicellulase enzyme may also be used alone or in combination as the enzyme. Among the hemicellulase enzymes, xylanase which is an enzyme decomposing xylan, mannase which is an enzyme decomposing mannan, and arabanase which is an enzyme decomposing araban are preferably used. Pectinase which is an enzyme decomposing pectin can be also used as hemicellulase enzyme.

pH of the dispersion liquid in the enzyme treatment is preferably maintained in a range in which the activity of the used enzyme will be high. For example, in the case of a commercially available enzyme derived from *Trichoderma*, pH is preferably from 4 to 8.

The temperature of the dispersion liquid in the enzyme treatment is preferably maintained in a range in which the activity of the used enzyme will be high. For example, in the case of a commercially available enzyme derived from *Trichoderma*, the temperature is preferably from 40° C. to 60° C. When the temperature is lower than the lower limit described above, the enzyme activity decreases and the treatment time becomes longer, whereas when the temperature exceeds the upper limit described above, the enzyme may be deactivated.

The treatment time of enzyme treatment is preferably in a range of 10 minutes to 24 hours. In the case where the treating time is less than 10 minutes, it is difficult for the effect of the enzyme treatment to be exhibited. In the case where the treating time exceeds 24 hours, decomposition by the enzyme of the cellulose fiber proceeds excessively and the average fiber length of the obtained fine fiber may be too short.

Since if active enzymes remain in an active state after a prescribed time period, the cellulose decomposition proceeds excessively as described above, so when the prescribed enzyme treatment ends, a terminating treatment for the enzyme reaction is preferably performed. Examples of the terminating treatment for the enzyme reaction include a method in which the dispersion liquid that has undergone the enzyme treatment is washed with water to remove the enzyme, a method in which sodium hydroxide is added to the dispersion liquid that has undergone the enzyme treatment in a manner such that the pH becomes approximately 12 to deactivate the enzyme, and a method in which the temperature of the dispersion liquid that has undergone the enzyme treatment is increased to a temperature of 90° C. to deactivate the enzyme.

[Treatment Using TEMPO]

In treatment using TEMPO, an oxidizing agent is reacted with the cellulose raw material in the presence of TEMPO and an alkali halide so as to replace some of the hydroxyl groups of the cellulose with carboxy groups (chemical modification). As a result, the bonding strength between cellulose fibers weakens, and the fibrillation properties improve.

The alkali halide used as an oxidation catalyst together with TEMPO is not particularly limited, and an alkali iodide, alkali bromide, alkali chloride, alkali fluoride, or the like can be selected appropriately and used.

The oxidizing agent is also not particularly limited, and sodium hypochlorite, sodium chlorite, sodium hypobromite, sodium bromite, or the like can be appropriately selected and used.

The amounts of TEMPO and the alkali halide that are used are not particularly limited but are each preferably from 0.1 parts by mass to 15 parts by mass with respect to 100 parts by mass of the solid content of the cellulose raw material. When the added amounts of TEMPO and the alkali halide are respectively greater than or equal to the lower limit described above, the yield improving effect of the microfibrous cellulose becomes even higher in the fibrillation step. However, when the amounts exceed the upper limit described above, there is a risk that the yield improving effect of the microfibrous cellulose may hit a ceiling in the fibrillation step.

The amount of the oxidizing agent that is used is also not particularly limited but is preferably from 1 part by mass to 80 parts by mass with respect to 100 parts by mass of the solid content of the cellulose raw material.

The pH of the dispersion liquid when the dispersion liquid containing the cellulose raw material is treated with TEMPO is adjusted appropriately in accordance with the type of oxidizing agent that is used. The pH of the cellulose raw material dispersion liquid is adjusted by appropriately adding a basic substance such as potassium hydroxide or ammonia or an acidic substance such as acetic acid or oxalic acid.

The treatment temperature when the cellulose raw material is treated with TEMPO is preferably in a range of 20° C. to 100° C., and the treatment time is preferably from 0.5 hours to 4 hours.

In addition, in order to perform treatment using TEMPO uniformly, it is preferable to perform treatment while stirring with various types of stirring devices.

[Treatment Using Sulfuric Acid]

Treatment using sulfuric acid is specifically treatment in which the cellulose raw material is added to a sulfuric acid aqueous solution and heated. Hydrolysis occurs as a result of treating the cellulose with sulfuric acid.

The concentration of the sulfuric acid aqueous solution is preferably from 0.01 mass % to 20 mass % and more preferably from 0.1 mass % to 10 mass %. When the concentration of the sulfuric acid aqueous solution is greater than or equal to the lower limit described above, the cellulose can be sufficiently decomposed, and when the concentration is lower than or equal to the upper limit described above, the substance has excellent handleability.

The heating temperature in the sulfuric acid treatment is preferably from 10° C. to 120° C. and more preferably from 20° C. to 80° C. When the heating temperature is greater than or equal to the lower limit described above, the decomposition reaction of cellulose can be easily controlled. To prevent water loss from the sulfuric acid aqueous solution, the vaporized water content is preferably condensed and refluxed during the heating.

The treatment time is preferably from 10 minutes to 5 hours.

[Cationization Agent Treatment]

Cationization agent treatment uses a cationization agent having a quaternary ammonium group and a group that reacts with the hydroxyl groups of the cellulose. Specific examples of cationization agents include glycidyl trialkyl ammonium halides such as glycidyl trimethyl ammonium chloride or 3-chloro-2-hydroxypropyl trimethyl ammonium chloride, or halohydrin forms thereof.

By reacting the cationization agent in the presence of an alkali hydroxide metal (sodium hydroxide, potassium hydroxide, or the like) serving as a catalyst, the cellulose is cationized, and the electrical repulsion between cations strengthens. As a result, the bonding strength between cellulose fibers weakens, and the fibrillation properties improve.

The amount of the cationization agent that is used is not particularly limited but is preferably from 10 parts by mass to 1000 parts by mass with respect to 100 parts by mass of the solid content of the cellulose raw material. When the amount of the cationization agent that is used is greater than or equal to the lower limit described above, the yield improving effect of the microfibrous cellulose becomes even higher in the fibrillation step. However, when the amounts exceed the upper limit described above, the yield improving effect of the microfibrous cellulose may hit a ceiling in the fibrillation step.

The treatment temperature in cationization agent treatment is preferably in a range of 30° C. and 90° C., and the treatment time is preferably from 1 hour to 3 hours.

(Fibrillation Step)

The fibrillation step is a step of obtaining a microfibrous cellulose dispersion liquid containing microfibrous cellulose by micronizing and fibrillating cellulose treated in the chemical treatment step in a dispersion medium (liquid compound, first dispersion medium).

The cellulose prior to micronization is preferably diluted with a dispersion medium to form a dispersion liquid having a cellulose content of 0.1 mass % to 1.0 mass % with respect to the microfibrous cellulose dispersion liquid. The cellulose content is more preferably from 0.2 mass % to 5 mass % and even more preferably from 0.3 mass % to 3 mass % per to the microfibrous cellulose dispersion liquid. When the cellulose content is greater than or equal to the lower limit described above, the fibrillation efficiency is high, and when the content is less than or equal to the upper limit described above, it is possible to prevent increases in viscosity during the fibrillation treatment.

Examples of the micronizing method include a method of using various pulverizing apparatuses. As a pulverizing apparatus, a high speed fibrillating device, grinder (stone mill type grinder), high-pressure homogenizer or ultra high-pressure homogenizer, high pressure collision type pulverizer, ball mill, bead mill, disk type refiner, conical refiner, twin screw kneader, oscillating mill, homomixer using high speed rotation, ultrasonic wave disperser, or apparatus for wet grinding such as a beater can be appropriately used. Of these, a high-pressure homogenizer, a high speed rotation type fibrillating device, or the combined use thereof is particularly preferable.

The microfibrous cellulose dispersion liquid obtained by micronization as described above may be used directly in the concentration step. Alternatively, after the microfibrous cellulose dispersion liquid is centrifuged, the supernatant liquid of the microfibrous cellulose dispersion liquid may be collected, and the supernatant liquid may be used in the concentration step. The fiber width tends to be narrow in the microfibrous cellulose contained in the supernatant liquid.

<Concentration Step>

Examples of concentration methods in the concentration step include a method having a flocculation step and a filtration step (hereafter called a "first concentration method") and a method having a heating step (hereafter called a "second concentration method"). The first concentration method is preferable in that a microfibrous cellulose aggregate with high redispersibility can be obtained easily.

The microfibrous cellulose content of the microfibrous cellulose dispersion liquid used in the concentration step is preferably less than 6 mass % and more preferably at most 3.0 mass % per the microfibrous cellulose dispersion liquid from the perspective of dispersion stability. The microfibrous cellulose content of the microfibrous cellulose dispersion liquid used in the concentration step is preferably at least 0.2 mass % and more preferably at least 0.5 mass % per the microfibrous cellulose dispersion liquid from the perspective of the productivity of the microfibrous cellulose aggregate.

In addition, in the concentration step, the content of microfibrous cellulose in the microfibrous cellulose aggregate that is obtained is preferably set to from 6 mass % to 80 mass %, more preferably from 10 mass % to 50 mass %, and even more preferably from 12 mass % to 30 mass % per the microfibrous cellulose dispersion liquid. By setting the content of microfibrous cellulose with respect to the microfibrous cellulose dispersion liquid after concentration to at least the lower limit described above, it is possible to further reduce the shipping cost and the storage cost, and when the content is less than or equal to the upper limit described above, a microfibrous cellulose aggregate can be manufactured easily and in a short period of time.

(First Concentration Method)

The first concentration method is a method having a flocculation step and a filtration step. The flocculation step in the first concentration method is a step of flocculating the microfibrous cellulose contained in the microfibrous cellulose dispersion liquid described above.

An example of a method for flocculating microfibrous cellulose is a method in which, when the surface charge of the microfibrous cellulose is negative, at least one type of a flocculant containing a salt of a polyvalent metal, a cationic surfactant, a cationic polymer flocculant, or an acid is added to the microfibrous cellulose dispersion liquid. Another example is a method in which, when the surface charge of the microfibrous cellulose is positive, at least one type of a flocculant containing a salt of a polyvalent metal, an anionic surfactant, an anionic polymer flocculant, or an alkali is added to the microfibrous cellulose dispersion liquid.

Specific examples of flocculants containing salts of polyvalent metals added to the microfibrous cellulose dispersion liquid include aluminum sulfate (sulfuric acid band), aluminum polychloride, calcium chloride, magnesium chloride, potassium chloride, calcium sulfate, magnesium sulfate, potassium sulfate, lithium phosphate, potassium phosphate, trisodium phosphate, disodium hydrogen phosphate, and the like. One type of these flocculants may be contained in the microfibrous cellulose aggregate, or two or more types of these flocculants may be contained.

Of these flocculants, aluminum sulfate is preferable when the surface charge of the microfibrous cellulose is negative, and disodium hydrogen phosphate is preferable when the surface charge of the microfibrous cellulose is positive from the perspectives of aggregability and cost.

When a flocculant containing a salt of a polyvalent metal is added, the added amount is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose. When the amount of the flocculant added is greater than or equal to the lower limit described above, the microfibrous cellulose can be flocculated easily. However, it is futile for a flocculant to be added in excess of the upper limit described above since there will be practically no improvement in the aggregability.

Examples of cationic surfactants to be added to the microfibrous cellulose dispersion liquid include quaternary ammonium salts such as alkyl trimethyl ammonium salts, dialkyl dimethyl ammonium salts, alkyl dimethyl benzyl ammonium salts, acyl amino ethyl diethyl ammonium salts, acyl amino ethyl diethyl amine salts, alkyl amide propyl dimethyl benzyl ammonium salts, alkyl pyridinium salts, alkyl pyridinium sulfuric acid salts, stearamide methyl pyridinium salts, alkyl quinolinium salts, alkyl isoquinolinium salts, fatty acid polyethylene polyamides, acyl amino ethyl pyridinium salts, and acyl colamino formyl methyl pyridinium salts, ester-bonded amine or ether-bonded quaternary ammonium salts such as stearoxy methyl pyridinium salts, fatty acid triethanolamine, fatty acid triethanolamine formic acid salts, trioxyethylene fatty acid triethanolamine, cetyloxy methyl pyridinium salts, and p-isooctyl phenoxy ethoxy ethyl dimethyl benzyl ammonium salts, heterocyclic amines such as alkyl imidazoline, 1-hydroxyethyl-2-alkylimidazoline, 1-acetylaminoethyl-2-alkylimidazoline, and 2-alkyl-4-methyl-4-hydroxymethyloxazoline, amine derivatives such as polyoxyethylene alkyl amine, N-alkyl propylene diamine, N-alkyl polyethylene polyamine, N-alkyl polyethylene polyamine dimethyl sulfuric acid salts, alkyl biguanide, and long-chain amine oxide, and the like.

One type of these cationic surfactants may be contained in the microfibrous cellulose aggregate, or two or more types may be contained.

Examples of cationic polymer flocculants to be added to the microfibrous cellulose dispersion liquid include copolymers with cationic monomers such as acrylamide and dialkyl amino alkyl (meth)acrylate, dialkyl amino alkyl (meth)acrylamide, or salts or quaternary compounds thereof, or homopolymers or copolymers of these cationic monomers. One type of these cationic polymer flocculants may be contained in the microfibrous cellulose aggregate, or two or more types may be contained.

When cationic surfactant and a cationic polymer flocculant is added, the added amount is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose. With the microfibrous cellulose dispersion liquid having a surfactant content greater than or equal to the lower limit described above, the microfibrous cellulose can be easily flocculated, and the filtration time can be reduced, which makes it possible to obtain a microfibrous cellulose-containing solution in a short period of time. However, it is futile for a surfactant to be added in excess of the upper limit described above since there will be practically no improvement in the aggregability.

The acid added to the microfibrous cellulose dispersion liquid may be either an inorganic acid or an organic acid. Examples of inorganic acids include sulfuric acid, hydrochloric acid, nitric acid, phosphoric acid, and the like. Examples of organic acids include formic acid, acetic acid, citric acid, malic acid, lactic acid, adipic acid, sebacic acid, stearic acid, maleic acid, succinic acid, tartaric acid, fumaric acid, gluconic acid, and the like. One type of these acids may be contained in the microfibrous cellulose aggregate, or two or more types of these acids may be contained.

Of these acids, sulfuric acid is preferable from the perspectives of aggregability and cost.

When an acid is added, the pH of the obtained microfibrous cellulose aggregate is preferably below 4.0 and more preferably below 3.0. When an acid is added so that the pH is lower than or equal to the upper limit described above, negatively charged microfibrous cellulose can be flocculated easily, which makes it possible to reduce the filtration time and to obtain a microfibrous cellulose-containing solution in a short period of time. However, when the added amount of the acid is small and the pH exceeds the upper limit described above, the flocculation of negatively charged microfibrous cellulose becomes weak, and it becomes difficult to remove the dispersion medium at the time of filtration in the next step.

The pH of the microfibrous cellulose aggregate is preferably set to above 1.0 and more preferably set to above 1.5. From a practical standpoint, it is difficult to set the pH of the microfibrous cellulose aggregate to a level lower than the lower limit described above.

In addition, the acid may be added to the microfibrous cellulose dispersion liquid together with the flocculants containing salts of polyvalent metals, cationic surfactants, and cationic polymers described above.

Examples of anionic surfactants to be added to the microfibrous cellulose dispersion liquid include sodium oleate, potassium oleate, sodium laurate, sodium dodecylbenzene sulfonate, sodium alkylnaphthalene sulfonate, sodium dialkyl sulfosuccinate, sodium polyoxyethylene alkyl ether sulfate, sodium polyoxyethlyene alkyl allyl ether sulfate, sodium polyoxyethylene dialkyl sulfate, polyoxyethylene alkyl ether phosphoric acid ester, polyoxyethylene alkyl allyl ether phosphoric acid ester, and the like.

One type of these anionic surfactants may be contained in the microfibrous cellulose aggregate, or two or more types of these anionic surfactants may be contained.

Examples of anionic polymer flocculants to be added to the microfibrous cellulose dispersion liquid include polyacrylic acids, sodium polyacrylate, copolymers of (meth)acrylic acids or alkali metal salts thereof and (meth)acrylamide, poly(meth)acrylamide hydrolysates, acryloylamino-2-methylpropyl sulfonic acid, styrene sulfonic acid, copolymers of vinyl sulfonic acids such as vinyl sulfonic acids or salts thereof and (meth)acrylic acids or alkali metal salts thereof and (meth)acrylamide, carboxymethylcellulose, carboxymethyl starch, sodium alginate, and the like. One type of these anionic polymer flocculants may be contained in the microfibrous cellulose aggregate, or two or more types may be contained.

When an anionic surfactant and an anionic polymer flocculant are added, the added amount is preferably from 0.5 parts by mass to 300 parts by mass, more preferably from 1.0 parts by mass to 50 parts by mass, and even more preferably from 2 parts by mass to 30 parts by mass with respect to 100 parts by mass of the microfibrous cellulose. The microfibrous cellulose dispersion liquid having a polymer flocculant content greater than or equal to the lower limit described above can be easily flocculated in microfibrous cellulose, and the filtration time can be reduced, which makes it possible to obtain a microfibrous cellulose-containing solution in a short period of time. However, it is futile for a polymer flocculant to be added in excess of the upper limit described above since there will be practically no improvement in the aggregability.

The alkali added to the microfibrous cellulose dispersion liquid may be an inorganic alkali compound or an organic alkali compound.

Examples of inorganic alkali compounds include lithium hydroxide, sodium hydroxide, potassium hydroxide, calcium hydroxide, lithium carbonate, lithium hydrogen carbonate, potassium carbonate, potassium hydrogen carbonate, sodium carbonate, sodium hydrogen carbonate, calcium carbonate, calcium phosphate, calcium hydrogen phosphate, and the like.

Examples of organic alkali compounds include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethyl ammonium hydroxide, tetraethyl ammonium hydroxide, tetrapropyl ammonium hydroxide, tetrabutyl ammonium hydroxide, benzyl trimethyl ammonium hydroxide, pyridine, N,N-dimethyl-4-aminopyridine, and the like.

One type of the alkali compounds described above may be used alone, or two or more types of the alkali compounds described above may be used in combination. Of these alkalis, sodium hydroxide is preferable from the perspectives of aggregability and cost.

When an alkali is added, the pH of the microfibrous cellulose aggregate is preferably above 10.0 and more preferably above 12.0. When an alkali is added so that the pH is greater than or equal to the lower limit described above, positively charged microfibrous cellulose can be flocculated easily, which makes it possible to reduce the filtration time and to obtain a microfibrous cellulose-containing solution in a short period of time. However, when the added amount of the alkali is small and the pH is less than the lower limit described above, the flocculation of positively charged microfibrous cellulose becomes weak, and it becomes difficult to remove the dispersion medium at the time of filtration in the next step.

The pH of the microfibrous cellulose aggregate is preferably below 14.0 and more preferably below 13.0. From a practical standpoint, it is difficult to set the pH of the microfibrous cellulose aggregate to a level exceeding the upper limit described above.

In addition, the alkali may be added to the microfibrous cellulose dispersion liquid together with the flocculants containing salts of polyvalent metals, anionic surfactants, and anionic polymer flocculants described above.

When a cellulose plasticizer is added, examples of plasticizers to be added to the microfibrous cellulose dispersion liquid include polyvalent alcohols such as sugar, sugar alcohol, glycerin, ethylene glycol, propanediol, butanediol, butanetriol, cyclobutanediol, butanetetraol, cyclobutanetetraol, pentanediol, cyclopentanediol, pentanetriol, pentanetetraol, cyclopentanetriol, or hydroquinone, aliphatic amines such as ethylenediamine, trimethylenediamine, triethylenediamine, tetramethylenediamine, hexamethylenediamine, diethylenetriamine, triethylenetetramine, and tetraethylenepentamine, and urea compounds such as urea. Two or more types of these plasticizers may also be contained.

When a plasticizer is added, the content is preferably from 0.5 parts by mass to 10,000 parts by mass, more preferably from 1.0 parts by mass to 8,000 parts by mass, and even more preferably from 2 parts by mass to 5,000 parts by mass with respect to 100 parts by mass of the microfibrous cellulose. The microfibrous cellulose dispersion liquid having an additive content greater than or equal to the lower limit described above has good redispersibility after concentration. However, it is futile for a plasticizer to be added in excess of the upper limit described above since there will be practically no improvement in the dispersibility at the time of redispersion.

When the surface charge of the microfibrous cellulose is negative, a cellulose plasticizer may be added to the microfibrous cellulose dispersion liquid together with at least one type of flocculant containing a salt of a polyvalent metal, an acid, a cationic surfactant, or a cationic polymer flocculant as described above. When the surface charge of the microfibrous cellulose is positive, a cellulose plasticizer may be added to the microfibrous cellulose dispersion liquid together with at least one type of flocculant containing a salt of a polyvalent metal, an alkali, an anionic surfactant, or an anionic polymer flocculant as described above.

The filtration step in the first concentration method is a step of removing the dispersion medium by filtering the microfibrous cellulose dispersion liquid after the flocculation step. It is not necessary for the dispersion medium to be removed completely as long as some of the dispersion medium is removed.

As a filtration method in the filtration step, a publicly known filtration method using a filter material such as filter paper, filter cloth, or a resin filter may be applied.

The aperture size of the filter material is preferably from 100 nm to 3,000 nm and more preferably from 200 nm to 1,000 nm from the perspectives of the separability of the dispersion medium and the filtration time.

(Second Concentration Method)

The heating step in the second concentration method is a step for heating the microfibrous cellulose dispersion liquid so as to evaporate and remove the dispersion medium.

Examples of heating methods include a method of filling a container having an open top with the microfibrous cellulose dispersion liquid and heating the container, a method of heating a spout with an open top and pouring the microfibrous cellulose dispersion liquid into the spout, a method of directly heating the microfibrous cellulose dispersion liquid, and the like.

The heating temperature is preferably from 40° C. to 120° C. and more preferably from 60° C. to 105° C. When the heating temperature is greater than or equal to the lower limit described above, the dispersion medium can be evaporated rapidly, and when the heating temperature is lower than or equal to the upper limit described above, it is possible to suppress the cost required for heating and to suppress the decomposition of cellulose due to heat.

"Method for Remanufacturing a Microfibrous Cellulose Dispersion Liquid"

The microfibrous cellulose dispersion liquid (second microfibrous cellulose dispersion liquid) can be remanufactured using the microfibrous cellulose aggregate described above.

That is, the method for remanufacturing the microfibrous cellulose dispersion liquid has a redispersion step of preparing a microfibrous cellulose-containing solution by adding a dispersion medium (second dispersion medium) to the microfibrous cellulose aggregate and performing dispersion treatment on the microfibrous cellulose-containing solution.

In other words, remanufacturing the microfibrous cellulose dispersion liquid refers to a method for manufacturing a microfibrous cellulose dispersion liquid having a redispersion step comprising a step of preparing a microfibrous cellulose-containing solution by adding a dispersion medium to the microfibrous cellulose aggregate described above and a step of dispersing the microfibrous cellulose in the microfibrous cellulose-containing solution.

The same dispersion medium as the liquid compound contained in the microfibrous cellulose aggregate can be used as the dispersion medium to be added to the microfibrous cellulose aggregate in the step of preparing a microfibrous cellulose-containing solution. However, it is unnecessary for the dispersion medium to be the same as the liquid compound.

In the step of preparing a microfibrous cellulose-containing solution in the redispersion step, the microfibrous cellulose content of the microfibrous cellulose-containing solution is preferably set to from 0.1 mass % to 10 mass % and more preferably from 0.2 mass % to 3 mass % per the microfibrous cellulose-containing solution. When the microfibrous cellulose content of the microfibrous cellulose-containing solution is greater than or equal to the lower limit described above, the dispersion stability of the microfibrous cellulose becomes higher, and when the content is less than or equal to the upper limit described above, the viscosity of the microfibrous cellulose does not become too high, and the microfibrous cellulose becomes relatively easy to handle.

The microfibrous cellulose content of the microfibrous cellulose-containing solution can be adjusted by the amount of the dispersion medium that is added, and the microfibrous cellulose content becomes lower when the added amount of the dispersion medium is greater.

In addition, the redispersibility becomes higher in the redispersion step, so when the surface charge of the microfibrous cellulose is negative, it is preferable to add an alkali to the microfibrous cellulose-containing solution. When the surface charge of the microfibrous cellulose is positive, it is preferable to add an acid.

The alkali added in the redispersion step is the same as the alkali used in alkali treatment in the concentration step described above. In addition, the acid is also the same as the acid used in the concentration step described above.

The acid or alkali may be added to the microfibrous cellulose-containing solution while stirring the microfibrous cellulose-containing solution.

When the surface charge of the microfibrous cellulose is negative, the pH (23° C.) of the microfibrous cellulose-containing solution is preferably set to above 7 and below 12, more preferably above 9 and below 12, and even more preferably above 11 and below 12 by adding an alkali. When the pH of the microfibrous cellulose dispersion liquid is greater than or equal to the lower limit described above, the redispersibility of the microfibrous cellulose becomes even higher.

When the surface charge of the microfibrous cellulose is positive, it is preferable to set the pH (23° C.) of the microfibrous cellulose-containing solution to a range of 4 to 7 by adding an acid. When the pH is within the range described above, the redispersibility of the microfibrous cellulose becomes even higher.

The same apparatus as the pulverization apparatus used in the fibrillation step described above, for example, can be used as the dispersion apparatus used in dispersion treatment. One type of pulverization apparatus may be used alone, or two or more types of pulverization apparatuses may be used in combination. When two or more types of the dispersion apparatuses are used in combination, each may be used sequentially, or the apparatuses may be used simultaneously.

It is preferable to use an ultrasonic disperser as the dispersion apparatus from the perspective that the microfibrous cellulose can also be easily redispersed in a microfibrous cellulose-containing solution having a high microfibrous cellulose content.

In the step of dispersing the microfibrous cellulose in the redispersion step, the microfibrous cellulose content of the microfibrous cellulose dispersion liquid is preferably set to from 0.1 mass % to 10 mass % and more preferably from 0.2 mass % to 3 mass % per the microfibrous cellulose dispersion liquid. When the microfibrous cellulose content of the microfibrous cellulose dispersion liquid is greater than or equal to the lower limit described above, the dispersion stability of the microfibrous cellulose becomes higher, and when the content is less than or equal to the upper limit described above, the viscosity of the microfibrous cellulose does not become too high, and the microfibrous cellulose becomes relatively easy to handle.

The microfibrous cellulose content of the microfibrous cellulose dispersion liquid can be adjusted by the amount of the dispersion medium that is added, and the microfibrous cellulose content becomes lower when the added amount of the dispersion medium is greater.

In the remanufacturing method described above, the dispersion treatment conditions and the alkali or acid addition conditions are selected so that the ratio (B/A) of the average fiber width B of the microfibrous cellulose contained in the remanufactured microfibrous cellulose dispersion liquid and the average fiber width A of the microfibrous cellulose contained in the microfibrous cellulose dispersion liquid used in the concentration step described above is preferably from 0.5 to 2.0 and more preferably from 0.5 to 1.0. When B/A is within the range described above, the average fiber width of the microfibrous cellulose contained in the remanufactured microfibrous cellulose dispersion liquid is roughly the same or narrower than the fiber width of the microfibrous cellulose contained in the microfibrous cellulose dispersion liquid used in the concentration step. Therefore, the microfibrous cellulose contained in the remanufactured microfibrous cellulose dispersion liquid easily achieves the properties of the original microfibrous cellulose (high strength, high rigidity, high dimensional stability, high dispersibility when conjugated with a resin, and transparency).

The microfibrous cellulose aggregate of this embodiment contains microfibrous cellulose having an average fiber width of 2 nm to 50 nm, a liquid compound composed of at least one of water or an organic solvent, an acid, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, an inorganic acid, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a cationic surfactant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a dialkyl dimethyl ammonium salt, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a cationic polymer flocculant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, an acid, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, an inorganic acid, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, aluminum sulfate, an acid, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, a cationic surfactant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, a dialkyl dimethyl ammonium salt, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, aluminum sulfate, a cationic surfactant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, a cationic polymer flocculant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, aluminum sulfate, a cationic polymer flocculant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, an alkali, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, an inorganic alkali compound, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, an anionic surfactant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, an anionic polymer flocculant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, an alkali, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, an inorganic alkali compound, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, disodium hydrogen phosphate, an alkali, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, an anionic surfactant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, disodium hydrogen phosphate, an anionic surfactant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, a flocculant containing a salt of a polyvalent metal, an anionic polymer flocculant, and a cellulose plasticizer, the microfibrous cellulose content being from 6 mass % to 80 mass % and the liquid compound content being at least 15 mass %.

The microfibrous cellulose aggregate of this embodiment contains microfibrous cellulose having an average fiber width of 2 nm to 50 nm, a liquid compound composed of at least one of water or an organic solvent, disodium hydrogen phosphate, an anionic polymer flocculant, and a cellulose plasticizer, the microfibrous cellulose content being from 6 mass % to 80 mass % and the liquid compound content being at least 15 mass %.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and an acid to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and an inorganic acid to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing aluminum sulfate and an acid to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and a cationic surfactant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and a dialkyl dimethyl ammonium salt to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing aluminum sulfate and a cationic surfactant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and a cationic polymer flocculant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing aluminum sulfate and a cationic polymer flocculant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and an alkali to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and an inorganic alkali compound to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing disodium hydrogen phosphate and an alkali to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and an anionic surfactant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing disodium hydrogen phosphate and an anionic surfactant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal and an anionic polymer flocculant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing disodium hydrogen phosphate and an anionic polymer flocculant to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing an acid and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing an inorganic acid and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a cationic surfactant and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a dialkyl dimethyl ammonium salt and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a cationic polymer flocculant and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, an acid, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, an inorganic acid, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing aluminum sulfate, an acid, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, a cationic surfactant, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, a dialkyl dimethyl ammonium salt, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing aluminum sulfate, a cationic surfactant, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, a cationic polymer flocculant, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing aluminum sulfate, a cationic polymer flocculant, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing an alkali and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing an inorganic alkali compound and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing an anionic surfactant and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing an anionic polymer flocculant and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, an alkali, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, an inorganic alkali compound, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing disodium hydrogen phosphate, an alkali, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, an anionic surfactant, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing disodium hydrogen phosphate, an anionic surfactant, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing a flocculant containing a salt of a polyvalent metal, an anionic polymer flocculant, and a cellulose plasticizer to the first microfibrous cellulose dispersion liquid.

The method for manufacturing the microfibrous cellulose aggregate of this embodiment has a concentration step of concentrating a first microfibrous cellulose dispersion liquid containing microfibrous cellulose having an average fiber width of 2 nm to 200 nm and a first dispersion medium. The concentration step has a flocculation step of flocculating the microfibrous cellulose contained in the first microfibrous cellulose dispersion liquid and a filtration step of removing the first dispersion medium by filtering the first microfibrous cellulose dispersion liquid after the flocculation step. In the flocculation step, the microfibrous cellulose is flocculated by adding a flocculant containing disodium hydrogen phosphate, an anionic polymer flocculant, and a cellulose plasticizer to the first microfibrous cellulose dispersion liquid.

EXAMPLES

<Working Example 1-1> (Chemical Treatment Step)

First, 20 g (in terms of absolute dry mass) of leaf bleached kraft pulp (LBKP) was prepared as a cellulose raw material so as to have a carboxy group content of 0.06 mmol/g and a solid content concentration of 30 mass % (water content: 70 mass %). The LBKP was placed in a container, and after 30 L of an ozone/oxygen mixed gas with an ozone concentration of 200 g/m$^3$ was introduced into the container, the container was shaken for 2 minutes at 25° C. The ozone addition rate at this time was 30 mass % per the pulp dry mass. After the pulp was left to stand for 6 hours, the ozone and the air inside the container were removed, and ozone oxidation treatment was ended. After the completion of treatment, the resultant was suspended and washed with ion-exchanged water, and washing was repeated until the pH of the rinse water became 6 or higher. The resultant was then filtered under reduced pressure using filter paper to obtain an ozone oxidized pulp with a solid content concentration of 20 mass %.

Next, 200 g of a 0.3 mass % sodium chlorite aqueous solution having a pH adjusted to 4 to 5 with hydrochloric acid (equivalent to 3 mass % of sodium chlorite per the absolute dry mass of the cellulose fibers) was added to 100 g of the ozone oxidized pulp (20 g in terms of absolute dry mass), and additional oxidation treatment was performed by reacting the resultant for 3 hours at 70° C. After the completion of additional oxidation treatment, the resultant was suspended and washed with ion-exchanged water, and washing was repeated until the pH of the rinse water became 6 or higher so as to obtain an oxidation-treated pulp.

A dispersion liquid with a solid content concentration of 2 mass % was prepared by adding ion-exchanged water to the oxidation-treated pulp described above (20 g in terms of absolute dry mass). Sodium hydroxide was added to this dispersion liquid so that the sodium hydroxide concentration was 0.3 mass %, and after this was stirred for 5 minutes, the resultant was left to stand for 30 minutes at room temperature. After the completion of treatment, the resultant was suspended and washed with ion-exchanged water, and washing was repeated until the pH of the rinse water became 8 or lower so as to obtain a dispersion liquid containing an alkali-treated pulp.

(Fibrillation Step)

Next, a cellulose fiber water dispersion liquid with a cellulose fiber concentration of 0.5 mass % was prepared by adding ion-exchanged water to the dispersion liquid containing the alkali-treated pulp. A microfibrous cellulose dispersion liquid was obtained by performing fibrillation treatment on the cellulose fiber water dispersion liquid for 30 minutes under conditions with a rotation speed of 21,500 rpm using a fibrillation treatment device (CLEARMIX-2.2S; manufactured by M Technique Co., Ltd.).

The obtained microfibrous cellulose dispersion liquid was centrifuged at 12,000 G for 10 minutes (centrifuge: "H-200NR"; manufactured by Kokusan Co., Ltd.), and the supernatant was collected. Ion-exchanged water was added to the supernatant so as to obtain a supernatant liquid (A) with a cellulose content of 0.2 mass %.

(Flocculation Step)

A gel-like aggregate of pH 2.8 was obtained by adding a 4N sulfuric acid aqueous solution (inorganic acid) to 110.5 g of the supernatant liquid (A) while stirring so as to flocculate the microfibrous cellulose.

(Filtration Step)

A PTFE membrane filter (ADVANTEC; pore size: 0.5 μm) that was immersed in isopropyl alcohol in advance was placed on a Buchner funnel type glass filter with a sintered size of 30 μm to 50 μm (KG-90 manufactured by ADVANTEC), and this was installed in a filtering flask. The filtration area at this time was 0.00441 m².

Next, the obtained gel-like aggregate was placed on the membrane filter under atmospheric pressure at 23° C., and the gel-like aggregate was concentrated by performing suction filtration using an aspirator (suction pressure: 0.08 MPa) so as to obtain a microfibrous cellulose aggregate.

(Redispersion Step)

A microfibrous cellulose-containing solution was obtained by adding the microfibrous cellulose aggregate obtained by the filtration step to water. Next, 1N sodium hydroxide was added to the microfibrous cellulose-containing solution while stirring to adjust the pH to 11.6. The total mass at this time was set to 110.5 g, which was the same as the supernatant liquid (A) prior to the flocculation step. A microfibrous cellulose water dispersion liquid was obtained by then performing redispersion treatment for 1 minute under conditions with a rotation speed of 11,000 rpm using a homomixer (ULTRA-TURRAX manufactured by IKA).

Working Example 1-2

A microfibrous cellulose water dispersion liquid was obtained in the same manner as in Working Example 1-1 with the exception that sodium hydroxide was not added to the microfibrous cellulose-containing solution in the redispersion step.

Working Example 1-3

A microfibrous cellulose water dispersion liquid was obtained in the same manner as in Working Example 1-1 with the exception that the flocculation step in Working Example 1-1 was omitted and the supernatant liquid (A) was concentrated instead of the gel-like aggregate in the filtration step.

<Working Example 2-1> (Chemical Treatment Step)

An aqueous solution of phosphoric acid-based compound (hereinafter, called the "phosphoric acid compound reagent") was obtained by dissolving 1.69 g of sodium dihydrogenphosphate dihydrate and 1.21 g of disodium hydrogenphosphate in 3.39 g of water. The pH of the phosphoric acid compound reagent was 6.0 at 25° C.

A cellulose raw material dispersion liquid was obtained by diluting the same type of LBKP as that used in Working Example 1 with ion-exchanged water so that the water content was 80 mass %. 6.29 g of the phosphoric acid compound reagent (20 parts by mass in terms of phosphorous element content relative to 100 parts by mass of dried pulp) was added to 15 g of this cellulose raw material dispersion liquid and then dried until the mass became constant using a fan drier at 105° C. (DKM400; Yamato Scientific Co., Ltd.) while kneading once every 15 minutes. Thereafter, the mixture was heat treated using a fan drier at 150° C. for one hour, and a phosphoric acid group was introduced into cellulose.

Next, 300 mL of ion-exchanged water was added to the cellulose in which the phosphoric acid group was introduced. After the mixture was washed while stirring, the mixture was dewatered. The dewatered pulp was diluted with 300 mL of ion-exchanged water. While stirring, 5 mL of a 1N sodium hydroxide aqueous solution was added gradually to the mixture, and an alkali-treated pulp dispersion liquid having a pH of 12 to 13 was obtained. This alkali-treated pulp dispersion liquid was then dewatered and washed by adding 300 mL of ion-exchanged water. This dewatering/washing was further repeated twice.

(Fibrillation Step)

After ion-exchanged water was added to the washed and dewatered pulp, the resultant was stirred so as to prepare a 0.5 mass % dispersion liquid. A microfibrous cellulose dispersion liquid was obtained by performing fibrillation treatment on this dispersion liquid for 30 minutes under conditions with a rotation speed of 21,500 rpm using a fibrillation treatment device (CLEARMIX-2.2S; manufactured by M Technique Co., Ltd.).

The obtained microfibrous cellulose dispersion liquid was centrifuged at 12,000 G for 10 minutes (centrifuge: "H-200NR"; manufactured by Kokusan Co., Ltd.), and the supernatant was collected. Ion-exchanged water was added to the supernatant so as to obtain a supernatant liquid (B) with a cellulose content of 0.2 mass %.

(Flocculation Step)

A gel-like aggregate of pH 1.5 was obtained by adding a 4N sulfuric acid aqueous solution (inorganic acid) to 110.5 g of the supernatant liquid (B) while stirring so as to flocculate the microfibrous cellulose.

(Filtration Step/Redispersion Step)

A microfibrous cellulose water dispersion liquid was obtained in the same manner as in the filtration step and the redispersion step of Working Example 1-1.

Working Example 2-2

A microfibrous cellulose water dispersion liquid was obtained in the same manner as in Working Example 2-1 with the exception that sodium hydroxide was not added to the microfibrous cellulose-containing solution in the redispersion step.

Working Example 2-3

A microfibrous cellulose water dispersion liquid was obtained in the same manner as in Working Example 2-1 with the exception that the flocculation step in Working Example 2-1 was omitted and the supernatant liquid (B) was concentrated instead of the gel-like aggregate in the filtration step.

<Working Example 3-1> (Chemical Treatment Step/Fibrillation Step)

A cellulose raw material dispersion liquid (pulp concentration: 2 mass %) was obtained by beating the same type of LBKP as that used in Working Example 1-1 for 200 minutes with a Niagara beater (volume: 23 liters; manufactured by Tozai Seiki K.K.).

The cellulose raw material dispersion liquid was dewatered to adjust the concentration to 3 mass %, and the pH was adjusted to 6 with 0.1 mass % sulfuric acid. After the resultant was warmed to 50° C. in a warm water bath, 3 mass % of an enzyme optimase CX7L (manufactured by Genencor) was added to the pulp (in terms of solid content) and reacted while stirring for 1 hour at 50° C. to perform enzyme treatment. An enzyme treated dispersion liquid was then obtained by heating the pulp dispersion liquid at 95° C. or greater for 20 minutes and deactivating the enzyme.

The enzyme treated dispersion liquid was filtered under reduced pressure while washing with ion-exchanged water until the electric conductivity at a cellulose content of 1 mass % reached a prescribed value or lower (10 µS/cm) (No. 2 filter paper was used, ADVANTEC). A 0.5 mass % dispersion liquid was prepared by placing the residue on the filter paper in ion-exchanged water and stirring. A microfibrous cellulose dispersion liquid was obtained by subjecting the dispersion liquid to micronization treatment (fibrillation) for 30 minutes at 21,500 rpm using a high-speed rotary type fibrillation device (CLEARMIX; manufactured by M Technique Co., Ltd.).

A supernatant liquid (C) was obtained by centrifuging the obtained microfibrous cellulose dispersion liquid and adjusting the concentration thereof in the same manner as in Working Example 1-1.
(Flocculation Step/Filtration Step/Redispersion Step)

A microfibrous cellulose water dispersion liquid was obtained in the same manner as in the flocculation step, filtration step, and redispersion step in Working Example 1-1 using the supernatant liquid (C).

Working Example 3-2

A microfibrous cellulose water dispersion liquid was obtained in the same manner as in Working Example 3-1 with the exception that sodium hydroxide was not added to the microfibrous cellulose-containing solution in the redispersion step.

Working Example 3-3

A microfibrous cellulose water dispersion liquid was obtained in the same manner as in Working Example 3-1 with the exception that the flocculation step in Working Example 3-1 was omitted and the supernatant liquid (C) was concentrated instead of the gel-like aggregate in the filtration step.

<Working Example 4-1> (Chemical Treatment Step/Fibrillation Step)

A dried pulp with a water content of 3 mass % or less was obtained by drying the same type of LBKP as that used in Working Example 1-1 for 3 hours at 105° C. Next, an autoclave was filled with 4 g of the dried pulp and 4 g of maleic anhydride (100 parts by mass with respect to 100 parts by mass of the dried pulp), and the resultant was treated for 2 hours at 150° C. Next, after the pulp treated with maleic anhydride was washed three times with 500 mL of water, ion-exchanged water was added to prepare 490 mL of a maleic anhydride-treated pulp dispersion liquid.

Next, 10 mL of a 4N sodium hydroxide aqueous solution was gradually added to the maleic anhydride-treated pulp dispersion liquid while stirring to adjust the pH range from 12 to 13, and the pulp was thus subjected to alkali treatment. The pulp after alkali treatment was then washed with water until the pH reached 8 or lower.

Next, an alkali-treated pulp dispersion liquid with a solid content concentration of 0.5 mass % was prepared by adding ion-exchanged water to the pulp after alkali treatment.

The obtained alkali-treated pulp dispersion liquid was subjected to fibrillation treatment, centrifuged, and adjusted in concentration in the same manner as in Working Example 1-1 so as to obtain a supernatant liquid (D).
(Flocculation Step/Filtration Step/Redispersion Step)

A microfibrous cellulose water dispersion liquid was obtained in the same manner as in the flocculation step, filtration step, and redispersion step in Working Example 1-1 using the supernatant liquid (D).

Working Example 4-2

A microfibrous cellulose water dispersion liquid was obtained in the same manner as in Working Example 4-1 with the exception that sodium hydroxide was not added to the microfibrous cellulose-containing solution in the redispersion step.

Working Example 4-3

A microfibrous cellulose water dispersion liquid was obtained in the same manner as in Working Example 4-1 with the exception that the flocculation step in Working Example 4-1 was omitted and the supernatant liquid (D) was concentrated instead of the gel-like aggregate in the filtration step.

Working Example 5-1

A microfibrous cellulose water dispersion liquid was obtained in the same manner as in Working Example 1-1 with the exception that the centrifugation step for the microfibrous cellulose dispersion liquid in Working Example 1-1 was omitted and a microfibrous cellulose dispersion liquid was concentrated instead of the supernatant liquid (A) in the concentration step.

Working Example 5-2

A microfibrous cellulose water dispersion liquid was obtained in the same manner as in Working Example 5-1 with the exception that sodium hydroxide was not added to the microfibrous cellulose-containing solution in the redispersion step.

Working Example 5-3

A microfibrous cellulose water dispersion liquid was obtained in the same manner as in Working Example 5-1 with the exception that the flocculation step in Working Example 5-1 was omitted and a microfibrous cellulose dispersion liquid was concentrated instead of the gel-like aggregate in the concentration step.

Working Example 6-1

A microfibrous cellulose water dispersion liquid was obtained in the same manner as in Working Example 3-1 with the exception that the centrifugation step for the microfibrous cellulose dispersion liquid in Working Example 3-1 was omitted and a microfibrous cellulose dispersion liquid was concentrated instead of the supernatant liquid (C) in the concentration step.

Working Example 6-2

A microfibrous cellulose water dispersion liquid was obtained in the same manner as in Working Example 6-1 with the exception that sodium hydroxide was not added to the microfibrous cellulose-containing solution in the redispersion step.

Working Example 6-3

A microfibrous cellulose water dispersion liquid was obtained in the same manner as in Working Example 6-1 with the exception that the flocculation step in Working Example 6-1 was omitted and a microfibrous cellulose dispersion liquid was concentrated instead of the gel-like aggregate in the concentration step.

<Working Example 7-1> (Chemical treatment step)

A cellulose raw material dispersion liquid (pulp concentration: 2 mass %) was obtained by beating the same type of LBKP as that used in Working Example 1-1 for 200 minutes with a Niagara beater (volume: 23 liters; manufactured by Tozai Seiki K.K.). The obtained pulp slurry was dewatered with a centrifugal dewatering device (manufactured by Kokusan Co., Ltd.) for 15 minutes at 2000 rpm so as to concentrate the pulp concentration to 25 mass %. Next, 60 parts by mass (dry mass) of the pulp, 7 parts by mass of sodium hydroxide, 2352 parts by mass of IPA, and 588 parts by mass of water were charged into an IKA stirrer with a rotation speed adjusted to 800 rpm, and the resultant was mixed and stirred for 30 minute at 30° C. The resultant was heated to 80° C., and 120 parts by mass (in terms of active component) of glycidyl trimethyl ammonium chloride was added as a cationization agent. After this was reacted for 1 hour, the reaction product was extracted, neutralized, washed, and concentrated to obtain a cationized pulp with a concentration of 25 mass %.

(Fibrillation Step)

Next, a cellulose fiber water dispersion liquid with a cellulose fiber concentration of 0.5 mass % was prepared by adding ion-exchanged water to the dispersion liquid containing the cationized pulp. A microfibrous cellulose dispersion liquid was obtained by performing fibrillation treatment on the cellulose fiber water dispersion liquid for 30 minutes under conditions with a rotation speed of 21,500 rpm using a fibrillation treatment device (CLEARMIX-2.2S; manufactured by M Technique Co., Ltd.).

The obtained microfibrous cellulose dispersion liquid was centrifuged at 12,000 G for 10 minutes (centrifuge: "H-200NR"; manufactured by Kokusan Co., Ltd.), and the supernatant was collected. Ion-exchanged water was added to the supernatant so as to obtain a supernatant liquid (E) with a cellulose content of 0.2 mass %.

(Flocculation Step)

A gel-like aggregate of pH 12 was obtained by adding a 1N sodium hydroxide aqueous solution (inorganic alkali) to 110.5 g of the supernatant liquid (E) while stirring so as to flocculate the microfibrous cellulose.

(Filtration Step)

A PTFE membrane filter (ADVANTEC; pore size: 0.5 μm) that was immersed in isopropyl alcohol in advance was placed on a Buchner funnel type glass filter with a sintered size of 30 μm to 50 μm (KG-90 manufactured by ADVANTEC), and this was installed in a filtering flask. The filtration area at this time was 0.00441 $m^2$.

Next, the obtained gel-like aggregate was placed on the membrane filter under atmospheric pressure at 23° C., and the gel-like aggregate was concentrated by performing suction filtration using an aspirator (suction pressure: 0.08 MPa) so as to obtain a microfibrous cellulose aggregate.

(Redispersion Step)

A microfibrous cellulose-containing solution was obtained by adding the microfibrous cellulose aggregate obtained by the filtration step to water. Next, 4N hydrochloric acid was added to the microfibrous cellulose-containing solution while stirring to adjust the pH to 4.0. The total mass at this time was set to 110.5 g, which was the same as the supernatant liquid (A) prior to the flocculation step. Next, redispersion treatment was performed for 1 minute under conditions with a rotation speed of 11,000 rpm using a homomixer (ULTRA-TURRAX manufactured by IKA). Next, the resultant was irradiated with ultrasonic waves for 30 seconds under conditions (cycle 1; amplitude: 100%) using an ultrasonic disperser (UP400S, manufactured by Hielscher) so as to obtain a water dispersion of microfibrous cellulose.

Working Example 7-2

A microfibrous cellulose water dispersion liquid was obtained in the same manner as in Working Example 7-1 with the exception that hydrochloric acid was not added to the microfibrous cellulose-containing solution in the redispersion step.

Working Example 7-3

A microfibrous cellulose water dispersion liquid was obtained in the same manner as in Working Example 7-1 with the exception that the flocculation step in Working Example 7-1 was omitted and the supernatant liquid (E) was concentrated instead of the gel-like aggregate in the filtration step.

Working Example 8

A 20 mass % microfibrous cellulose aggregate was obtained by drying the 12 mass % microfibrous cellulose aggregate obtained in the filtration step in Working Example 1-1 in an oven at 100° C. Using this 20 mass % microfibrous cellulose aggregate, the pH was adjusted and the aggregate was treated with a homomixer in the same manner as in the redispersion step of Working Example 1. The resultant was then irradiated with ultrasonic waves for 30 seconds under conditions (cycle 1; amplitude: 100%) using an ultrasonic disperser (UP400S, manufactured by Hielscher) so as to obtain a water dispersion of microfibrous cellulose.

Working Example 9

A microfibrous cellulose water dispersion liquid was obtained in the same manner as in Working Example 8 with the exception that a 30 mass % microfibrous cellulose aggregate was obtained by drying the 12 mass % microfibrous cellulose aggregate obtained in the filtration step in Working Example 1-1 in an oven at 100° C.

Working Example 10

A microfibrous cellulose water dispersion liquid was obtained in the same manner as in Working Example 8 with the exception that a 47 mass % microfibrous cellulose aggregate was obtained by drying the 12 mass % microfibrous cellulose aggregate obtained in the filtration step in Working Example 1-1 in an oven at 100° C.

Working Example 11

A microfibrous cellulose water dispersion liquid was obtained in the same manner as in Working Example 8 with the exception that a 78 mass % microfibrous cellulose aggregate was obtained by drying the 12 mass % microfibrous cellulose aggregate obtained in the filtration step in Working Example 1-1 in an oven at 100° C.

Working Example 12

Instead of 4N sulfuric acid in the flocculation step of Working Example 1-1, 4 mass %, with respect to the dry mass of the pulp, of a 2 mass % aluminum sulfate solution was added. A microfibrous cellulose water dispersion liquid was obtained by subjecting the obtained microfibrous cellulose aggregate to the same treatment as that of the redispersion step of Working Example 8.

Working Example 13

A microfibrous cellulose water dispersion liquid was obtained in the same manner as in Working Example 12 with the exception that 12 mass % of a polyaluminum chloride solution (Paho #2S manufactured by Asada Kogyo K.K.) serving as a flocculant containing a salt of a polyvalent metal was added with respect to the dry mass of the pulp in terms of the $Al(OH)_3$ content instead of 4N sulfuric acid in the flocculation step.

Working Example 14

A microfibrous cellulose water dispersion liquid was obtained in the same manner as in Working Example 7-1 with the exception that 200 mass % of a 10 mass % sodium sulfate solution serving as a flocculant containing a salt of a polyvalent metal was added with respect to the dry mass of the pulp instead of 1N sodium hydroxide in the flocculation step.

Working Example 15

A microfibrous cellulose water dispersion liquid was obtained in the same manner as in Working Example 7-1 with the exception that 100 mass % of a 10 mass % disodium hydrogen phosphate solution serving as a flocculant containing a salt of a polyvalent metal was added with respect to the dry mass of the pulp instead of 1N sodium hydroxide in the flocculation step.

Working Example 16

First, 10 mass % of didecyl dimethyl ammonium chloride (Catiogen DDM-PG manufactured by Dai-ichi Kogyo Seiyaku Co., Ltd.) serving as a cationic surfactant was added with respect to the dry mass of the pulp instead of 4N sulfuric acid in the flocculation step of Working Example 1-1. A microfibrous cellulose water dispersion liquid was obtained by subjecting the obtained microfibrous cellulose aggregate to the same treatment as that of the redispersion step of Working Example 8.

Working Example 17

First, 10 mass % of 2% sodium oleate (anionic surfactant) was added with respect to the dry mass of the pulp instead of a 1N sodium hydroxide aqueous solution in the flocculation step of Working Example 7-1. A microfibrous cellulose water dispersion liquid was obtained by subjecting the obtained microfibrous cellulose aggregate to the same treatment as that of the redispersion step of Working Example 8.

Working Example 18

First, 5,000 mass % of sorbitol (Sorbit T-70 manufactured by Mitsubishi Shoji Foodtech Co., Ltd.) serving as a plasticizer was added with respect to the dry mass of the pulp in addition to 4N sulfuric acid in the flocculation step of Working Example 9. A microfibrous cellulose water dispersion liquid was obtained by subjecting the obtained microfibrous cellulose aggregate to the same treatment as that of the redispersion step of Working Example 8.

Working Example 19

First, 5,000 mass % of ethylene glycol serving as a plasticizer was added with respect to the dry mass of the pulp in addition to 4N sulfuric acid in the flocculation step of Working Example 9. A microfibrous cellulose water dispersion liquid was obtained by subjecting the obtained microfibrous cellulose aggregate to the same treatment as that of the redispersion step of Working Example 8.

Working Example 20

First, 5,000 mass % of glycerin serving as a plasticizer was added with respect to the dry mass of the pulp in addition to 4N sulfuric acid in the flocculation step of Working Example 9. A microfibrous cellulose water dispersion liquid was obtained by subjecting the obtained microfibrous cellulose aggregate to the same treatment as that of the redispersion step of Working Example 8.

(Evaluation)

The average fiber width, microfibrous cellulose content, liquid compound content, pH, filtration time at the time of concentration, and redispersibility of the microfibrous cellulose were measured for the microfibrous cellulose aggregate of each working example using the following methods. The results of the measurements are shown in Tables 1 to 3.

[Average Fiber Width]

The average fiber width was measured with the method described in paragraph [0012] above.

[Microfibrous Cellulose Content]

After the mass of the microfibrous cellulose aggregate was measured, the aggregate was heated and dried for 12 hours at 105° C. to prepare a dried product, and the mass of the dried product was measured. The microfibrous cellulose content was then determined from the formula [(mass of the dried product)/(mass of the microfibrous cellulose aggregate)]×100.

[Liquid Compound Content]

The liquid compound content was determined from the formula [(mass of the microfibrous cellulose aggregate−mass of the dried product−mass of the added acid, alkali, or flocculant)/(mass of the microfibrous cellulose aggregate)]×100.

[pH]

The pH was measured at 23° C. using a pH meter.

[Filtration Time]

The time required for the microfibrous cellulose aggregate to be obtained from the gel-like aggregate in the filtration step was measured. The measurement of the filtration time was ended at the point when the glossiness of the microfibrous cellulose aggregate surface disappeared and the filtrate mass reached 97% of the liquid mass measured when filtration was begun.

[Redispersibility]

The haze of the supernatant liquid prior to concentration (supernatant liquid prior to the flocculation step) and the haze of the water dispersion of microfibrous cellulose after redispersion were measured for Working Examples 1 to 4 and 7 to 20 using a haze meter HM-150 manufactured by Murakami Color Research Laboratory Co., Ltd.

The haze of the microfibrous cellulose dispersion liquid prior to concentration (microfibrous cellulose dispersion liquid prior to the flocculation step) and the haze of the water dispersion of microfibrous cellulose after redispersion were measured for Working Examples 5 and 6 using a haze meter HM-150 manufactured by Murakami Color Research Laboratory Co., Ltd.

The redispersibility is superior when the difference between the haze of the supernatant liquid or the microfibrous cellulose dispersion liquid prior to concentration and the haze of the water dispersion of microfibrous cellulose after redispersion is smaller.

TABLE 1

| | | Additives | | | Microfibrous cellulose - containing substance | |
|---|---|---|---|---|---|---|
| | Chemical treatment | Type of functional group | Functional group amount (mmol/g) | Surface charge | at the time of the flocculation step | Average fiber width (nm) | Microfibrous cellulose content (mass %) |
| Working Example 1-1 | Ozone treatment | Carboxy group | 0.445 | Negative | Sulfuric acid | 4 | 12.0 |
| Working Example 1-2 | | | | | Sulfuric acid | | |
| Working Example 1-3 | | | | | None | | 10.2 |
| Working Example 2-1 | Phosphoric acid treatment | Phosphoric acid group | 0.736 | Negative | Sulfuric acid | 4 | 11.5 |
| Working Example 2-2 | | | | | Sulfuric acid | | |
| Working Example 2-3 | | | | | None | | 9.6 |
| Working Example 3-1 | Enzyme treatment | Carboxy group | 0.06 | Negative | Sulfuric acid | 10 | 17.0 |
| Working Example 3-2 | | | | | Sulfuric acid | | |
| Working Example 3-3 | | | | | None | | 15.5 |
| Working Example 4-1 | Maleic acid treatment | Carboxy group | 0.629 | Negative | Sulfuric acid | 4 | 11.8 |
| Working Example 4-2 | | | | | Sulfuric acid | | |
| Working Example 4-3 | | | | | None | | 9.8 |
| Working Example 5-1 | Ozone treatment | Carboxy group | 0.445 | Negative | Sulfuric acid | 80 | 23.0 |
| Working Example 5-2 | | | | | Sulfuric acid | | |
| Working Example 5-3 | | | | | None | | 20.0 |
| Working Example 6-1 | Enzyme treatment | Carboxy group | 0.06 | Negative | Sulfuric acid | 140 | 25.2 |
| Working Example 6-2 | | | | | Sulfuric acid | | |

TABLE 1-continued

| | | | | | | | |
|---|---|---|---|---|---|---|---|
| Working Example 6-3 | | | | | None | | 21.1 |
| Working Example 7-1 | Cationization agent treatment | Quaternary ammonium group | 0.729 | Positive | Sodium hydroxide | 4 | 15.0 |
| Working Example 7-2 | | | | | Sulfuric acid | | |
| Working Example 7-3 | | | | | None | | 14.0 |

| | | Microfibrous cellulose -containing substance | | | Haze of the microfibrous cellulose water dispersion liquid (%) | |
|---|---|---|---|---|---|---|
| | | Liquid compound content (mass %) | pH | Filtration time (min) | Prior to concentration | After redispersion |
| | Working Example 1-1 | 86.0 | 3.2 | 10 | 10.0 | 10.7 |
| | Working Example 1-2 | | | | | 17.0 |
| | Working Example 1-3 | 89.8 | 6.9 | 140 | | 10.8 |
| | Working Example 2-1 | 86.4 | 1.6 | 25 | 18.0 | 20.4 |
| | Working Example 2-2 | | | | | 29.2 |
| | Working Example 2-3 | 90.4 | 7.4 | 300 | | 20.2 |
| | Working Example 3-1 | 81.0 | 3.6 | 8 | 50.8 | 52.0 |
| | Working Example 3-2 | | | | | 59.9 |
| | Working Example 3-3 | 84.5 | 6.0 | 55 | | 51.0 |
| | Working Example 4-1 | 85.9 | 3.1 | 31 | 15.5 | 14.9 |
| | Working Example 4-2 | | | | | 27.3 |
| | Working Example 4-3 | 90.2 | 6.6 | 360 | | 26.6 |
| | Working Example 5-1 | 74.5 | 3.2 | 2 | 23.6 | 23.3 |
| | Working Example 5-2 | | | | | 28.6 |
| | Working Example 5-3 | 80.0 | 6.9 | 100 | | 22.9 |
| | Working Example 6-1 | 72.6 | 3.6 | 3 | 89.0 | 88.7 |
| | Working Example 6-2 | | | | | 92.0 |
| | Working Example 6-3 | 88.9 | 6.0 | 60 | | 89.2 |
| | Working Example 7-1 | 82.9 | 11.6 | 44 | 24.0 | 18.5 |
| | Working Example 7-2 | | | | | 22.5 |
| | Working Example 7-3 | 86.0 | 6.5 | 168 | | 20.2 |

TABLE 2

| | Chemical treatment | Type of functional group | Functional group amount (mmol/g) | Surface charge | Additives at the time of the flocculation step | Average fiber width (nm) | Microfibrous cellulose -containing substance Microfibrous cellulose content (mass %) |
|---|---|---|---|---|---|---|---|
| Working Example 8 | Ozone treatment | Carboxy group | 0.445 | Negative | Sulfuric acid | 4 | 20.0 |
| Working Example 9 | | Carboxy group | 0.445 | Negative | Sulfuric acid | 4 | 30.0 |
| Working Example 10 | | Carboxy group | 0.445 | Negative | Sulfuric acid | 4 | 47.0 |

TABLE 2-continued

| | Chemical treatment | Type of functional group | Functional group amount (mmol/g) | Surface charge | Additives at the time of the flocculation step | Average fiber width (nm) | Microfibrous cellulose content (mass %) |
|---|---|---|---|---|---|---|---|
| Working Example 11 | | Carboxy group | 0.445 | Negative | Sulfuric acid | 4 | 78.0 |
| Working Example 12 | | Carboxy group | 0.445 | Negative | Aluminum sulfate | 4 | 15.5 |
| Working Example 13 | | Carboxy group | 0.445 | Negative | Polyaluminum chloride | 4 | 16.6 |
| Working Example 14 | Cationization agent treatment | Quaternary ammonium group | 0.729 | Positive | Sodium sulfate | 4 | 13.3 |
| Working Example 15 | | Quaternary ammonium group | 0.729 | Positive | Diodium hydrogen phospate | 4 | 13.2 |

| | Microfibrous cellulose -containing substance | | | Haze of the microfibrous cellulose water dispersion liquid (%) | |
|---|---|---|---|---|---|
| | Liquid compound content (mass %) | pH | Filtration time (min) | Prior to concentration | After redispersion |
| Working Example 8 | 77.7 | 3.2 | 10 | 10.0 | 6.2 |
| Working Example 9 | 67.7 | 3.2 | 10 | 10.0 | 7.2 |
| Working Example 10 | 50.9 | 3.2 | 10 | 10.0 | 8.3 |
| Working Example 11 | 20.0 | 3.2 | 10 | 10.0 | 8.8 |
| Working Example 12 | 81.0 | 4.1 | 6 | 10.0 | 5.4 |
| Working Example 13 | 63.4 | 4.5 | 11 | 10.0 | 7.8 |
| Working Example 14 | 77.8 | 7.5 | 35 | 24.0 | 24.5 |
| Working Example 15 | 79.0 | 8.3 | 33 | 24.0 | 25.0 |

TABLE 3

| | Chemical treatment | Type of functional group | Functional group amount (mmol/g) | Surface charge | Additives at the time of the flocculation step | Average fiber width (nm) | Microfibrous cellulose content (mass %) |
|---|---|---|---|---|---|---|---|
| Working Example 16 | Ozone treatment | Carboxy group | 0.445 | Negative | Didecyl dimethyl ammonium chloride | 4 | 12.0 |
| Working Example 17 | Cationization agent treatment | Quaternary ammonium group | 0.729 | Positive | Sodium oleate | 4 | 12.0 |
| Working Example 18 | Ozone treatment | Carboxy group | 0.445 | Negative | Sulfuric acid + sorbitol | 4 | 30.0 |
| Working Example 19 | | Carboxy group | 0.445 | Negative | Sulfuric acid + ethylene glycol | 4 | 30.0 |
| Working Example 20 | | Carboxy group | 0.445 | Negative | Sulfuric acid + glycerin | 4 | 30.0 |

| | Microfibrous cellulose -containing substance | | | Haze of the microfibrous cellulose water dispersion liquid (%) | |
|---|---|---|---|---|---|
| | Liquid compound content (mass %) | pH | Filtration time (min) | Prior to concentration | After redispersion |
| Working Example 16 | 86.5 | 6.9 | 11 | 10.0 | 8.9 |
| Working Example 17 | 86.7 | 6.9 | 12 | 10.0 | 10.8 |
| Working Example 18 | 59.6 | 3.2 | 55 | 10.0 | 6.0 |
| Working Example 19 | 65.5 | 3.2 | 10 | 10.0 | 6.3 |
| Working Example 20 | 64.2 | 3.2 | 18 | 10.0 | 6.2 |

In each working example, it was possible to obtain a water dispersion liquid of microfibrous cellulose by redispersing the microfibrous cellulose aggregate.

In addition, in the working examples in which microfibrous cellulose aggregates were obtained via the flocculation step and the filtration step after the fibrillation step (Working Examples 1-1, 1-2, 2-1, 2-2, 3-1, 3-2, 4-1, 4-2, 5-1, 5-2, 6-1, 6-2, 7-1, 7-2, and 8 to 20), the filtration time was short and the redispersibility of microfibrous cellulose was excellent. Furthermore, in Working Examples 1-1, 2-1, 3-1, 4-1, 5-1, 6-1, 8 to 13, 16, and 18 to 20 in which sodium hydroxide was added at the time of redispersion, the redispersibility of microfibrous cellulose was particularly excellent. In addition, in Working Examples 7-1, 14, 15, and 17 in which hydrochloric acid was added at the time of redispersion, the redispersibility of microfibrous cellulose was particularly excellent. Moreover, in the case of Working Examples 18 to 20 in which the microfibrous cellulose aggregate contained a cellulose plasticizer, the redispersibility of microfibrous cellulose was particularly excellent.

In the working examples in which the microfibrous cellulose aggregate was obtained by omitting the flocculation step (Working Examples 1-3, 2-3, 3-3, 4-3, 5-3, 6-3, and 7-3), the filtration time became long.

INDUSTRIAL APPLICABILITY

A microfibrous cellulose aggregate capable of reducing the shipping cost and storage cost per unit microfibrous cellulose can be provided. In addition, a method for manufacturing this microfibrous cellulose aggregate can be provided.

What is claimed is:

1. A microfibrous cellulose-containing substance, comprising:
    microfibrous cellulose having fibers with an average fiber width of 2 nm to 50 nm;
    a first liquid compound comprising at least one of water or an organic solvent; and
    one selected from the group consisting of an alkali, sodium oleate, potassium oleate, sodium laurate, sodium dodecylbenzene sulfonate, sodium alkylnaphthalene sulfonate, sodium dialkyl sulfosuccinate, sodium polyoxyethylene alkyl ether sulfate, sodium polyoxyethlyene alkyl allyl ether sulfate, sodium polyoxyethylene dialkyl sulfate, polyoxyethylene alkyl ether phosphoric acid ester, polyoxyethylene alkyl allyl ether phosphoric acid ester, carboxymethylcellulose, carboxymethyl starch, and sodium alginate;
    wherein a surface charge of the microfibrous cellulose is positive,
    a content of the microfibrous cellulose is from 6 mass % to 80 mass % per a mass of an entire microfibrous cellulose-containing substance; and
    a content of the first liquid compound is at least 15 mass % per the mass of the entire microfibrous cellulose-containing substance
    wherein said microfibrous cellulose is flocculated such that the fibers of said microfibrous cellulose are aggregated, and
    wherein said microfibrous cellulose-containing substance is in a gel state.

2. The microfibrous cellulose-containing substance according to claim 1, further comprising a cellulose plasticizer.

3. The microfibrous cellulose-containing substance according to claim 1, wherein at least 40 mass % of a solid content contained in the microfibrous cellulose-containing substance is the microfibrous cellulose.

4. The microfibrous cellulose-containing substance according to claim 1, wherein a maximum fiber width of the microfibrous cellulose is at most 50 nm.

* * * * *